United States Patent
Subramaniam et al.

(10) Patent No.: US 12,242,539 B2
(45) Date of Patent: *Mar. 4, 2025

(54) INSIGHTS INTO PERFORMANCE OF A BOT SYSTEM

(71) Applicant: Oracle International Corporation, Redwood Shores, CA (US)

(72) Inventors: Srikant Subramaniam, Alameda, CA (US); Sundar Shenbagam, San Ramon, CA (US); Neerja Bhatt, Sunnyvale, CA (US); Ganesh Kumar, Sunnyvale, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,829

(22) Filed: Apr. 21, 2023

(65) Prior Publication Data

US 2023/0259558 A1    Aug. 17, 2023

Related U.S. Application Data

(63) Continuation of application No. 16/829,976, filed on Mar. 25, 2020, now Pat. No. 11,651,033.

(Continued)

(51) Int. Cl.
  *G06F 16/9032* (2019.01)
  *G10L 15/06* (2013.01)

(52) U.S. Cl.
  CPC ...... *G06F 16/90332* (2019.01); *G10L 15/063* (2013.01); *G10L 2015/0631* (2013.01)

(58) Field of Classification Search
  CPC ........... G06F 16/90332; G10L 15/0653; G10L 2015/0631
  See application file for complete search history.

(56) References Cited

U.S. PATENT DOCUMENTS 8,798,242 B1 *  8/2014  Sankaranarayanan .. H04M 3/51
                                                              379/265.03
9,167,095 B1 * 10/2015  Selvin ................. H04M 3/5175
                           (Continued)

OTHER PUBLICATIONS

U.S. Appl. No. 16/829,976, "First Action Interview Office Action Summary", Jul. 7, 2022, 4 pages.

(Continued)

*Primary Examiner* — Sonia L Gay
(74) *Attorney, Agent, or Firm* — Kilpatrick Townsend & Stockton LLP

(57) ABSTRACT

The present disclosure relates generally to techniques for analyzing and improving a bot system, and more particularly to an analytic system integrated with a bot system for monitoring, analyzing, visualizing, diagnosing, and improving the performance of the bot system. For example, an analytic system is integrated with a bot system for monitoring, analyzing, visualizing, and improving the performance of the bot system. The analytic system monitors events occurred in conversations between end users and the bot system, aggregates and analyzes the collected events, and provides information regarding the conversations graphically on a graphic user interface as insights reports at different generalization levels. The insights reports offer developer-oriented analytics to pinpoint issues with skills so a user can address them before they cause problems. The insights let a user track conversation trends over time, identify execution paths, determine the accuracy of their intent resolutions, and access entire conversation transcripts.

20 Claims, 38 Drawing Sheets

Related U.S. Application Data

(60) Provisional application No. 62/839,270, filed on Apr. 26, 2019.

(56) References Cited

U.S. PATENT DOCUMENTS

| | | |
|---|---|---|
| 10,884,598 B2 | 1/2021 | Bhatt et al. |
| 11,355,098 B1 * | 6/2022 | Zhong .................... G10L 15/22 |
| 2014/0098948 A1 * | 4/2014 | Kulkarni ............. H04M 7/0045 |
| | | 379/265.03 |
| 2019/0102078 A1 | 4/2019 | Bhatt et al. |
| 2019/0124020 A1 | 4/2019 | Bobbarjung et al. |
| 2020/0143386 A1 * | 5/2020 | Tomlinson ........... G06Q 30/016 |
| 2020/0228469 A1 * | 7/2020 | Mullins .................. H04L 51/02 |

OTHER PUBLICATIONS

U.S. Appl. No. 16/829,976, "First Action Interview Pilot Program Pre-Interview Communication", Apr. 25, 2022, 4 pages.
U.S. Application No. 16/829, 976, "Notice of Allowance", Jan. 11, 2023, 8 pages.
European Application No. 20720878.6, "Office Action", Jan. 13, 2023, 4 pages.
International Application No. PCT/US2020/024701, "International Preliminary Report on Patentability", Nov. 4, 2021, 8 pages.
International Application No. PCT/US2020/024701, "International Search Report and Written Opinion", Jul. 24, 2020, 11 pages.
Indian Application No. IN202147043638, "First Examination Report", mailed Nov. 2, 2023, 7 pages.

\* cited by examiner

| How are my skills performing? Trend Summary | | | | Completion Rate Ascending ▼ |
|---|---|---|---|---|
| Skill | Completion Rate | Errors | Unresolved | Performance History |
| RetailSkill | 0% | 6 | 0 | . |
| BarSkill | 100% | 0 | 0 | |
| Stocks | 100% | 0 | 0 | |
| PizzaBot | 100% | 0 | 0 | - |
| Travel | 100% | 0 | 0 | |
| FinBot | 100% | 0 | 0 | |

| How are my skills performing? | Individual Skills | Overall Ecosystem | | |
|---|---|---|---|---|
| Skill | Completion Rate | Errors | Unresolved | Performance History [Total Ascending ▼] |
| CbPizzaBot | 50% | 1 | 0 | — |
| PizzaBot | 100% | 0 | 0 | — |
| FinancialBot | 50% | 5 | 0 | — |
| FinancialOnABot | 20% | 16 | 0 | ~ |

Page 1 of 1 (1-4 of 4 items) |< < [1] > >|

Channels: All   Locale: All   Reset to All
Overview  Intents  Paths  Conversations  Retrainer  Export Last updated 6 minutes ago ↻
Last 365 Days ▼

Show me all utterances where [All] [Any] of the following are true

[Intent ▼] [Matches ▼] [unresolvedIntent ×]

[+ Criteria] [Search]

Intent Classification

| | Utterances | Result | Win Margin | Intents Score | | Add To | |
|---|---|---|---|---|---|---|---|
| ☐ ▲ | ☑ are you accepting franchise | unresolvedIntent | 45.35 | ▬▬▬▬▬ | ▪ unresolvedIntent<br>▪ OpenFranchise<br>▪ FileComplaint | OpenFranchise ▼ | |
| ☐ ▲ | ☐ file a complaint | unresolvedIntent | 33.78 | ▬▬▬▬ | ▪ FileComplaint<br>▪ unresolvedIntent<br>▪ OpenFranchise | Select Intent ▼ | |
| ☐ ▲ | ☐ what does this bot do? | unresolvedIntent | 13.14 | ▬▬ | ▪ unresolvedIntent<br>▪ Welcome<br>▪ FileComplaint | Select Intent ▼ | |
| ☐ ▲ | ☐ unresolvedIntent | unresolvedIntent | 52.61 | ▬▬▬▬▬▬ | ▪ unresolvedIntent<br>▪ FileComplaint<br>▪ TrackOrders | Select Intent ▼ | |
| ☐ ▲ | ☐ who won the us open | unresolvedIntent | 35.49 | ▬▬▬▬ | ▪ unresolvedIntent<br>▪ OpenFranchise<br>▪ TrackOrders | Select Intent ▼ | |

Page [8] of 11 (36-40 of 51 items)  |< < 1 ... 6 7 [8] 9 ... 11 > >|

[Add Example]

| Overview | Intents | Paths | Conversations | Retrainer | Export | | Last updated a few seconds ago ↻ |
|---|---|---|---|---|---|---|---|
| | | | | | | | Last 365 Days ▼ |

+ Export

| Filter by Name or Created By | Q | Filter by Status | ▼ | Sort By | Last Run Descending | ▼ | |
|---|---|---|---|---|---|---|---|

| | Name | Last Run | Created By | Status |
|---|---|---|---|---|
| ☐ | export_order_Flowers | 2018-12-12 17:43:00:02 | user | No Data ✕ |
| | Date Range: 2018-12-12 to 2018-12-12 | | | |
| | Filters: INTENT matches one of OrderFlowers | | | |
| ▲ | export_file_complaint | 2018-12-12 17:41:57:02 | user | Completed ✕ |

Page 1 of 1 (1-2 of 2 items) |< < 1 > >|

FIG. 6N

Conversations

109 Conversations

47 Completed

62 Incomplete

FIG. 7A

| Intent | Outcome | Sort By | Errors |
|---|---|---|---|
| OrderFlowers ▼ | Incomplete ▼ | Latest ▼ | ◯ |

Selected State path: setImageHost, setDiscount, enableAutoTranslation, checkUserDetectedLanguage, getUserIntent, startOrderFlowers, initializeCardIndex, setRangeSize, checkFlowerBouquetEntity, showOrderTypeMenu, switchOrderType, System.DefaultErrorHandler     Remove

| Intent | Outcome | Time | User | Skill | |
|---|---|---|---|---|---|
| OrderFlowers | Incomplete | 2 months ago | orderflowers; orderType: Flowers | Do you want to send flowers or a bouquet? Oops I'm encountering a spot of trouble. Please try again later... | View Conversation |
| OrderFlowers | Incomplete | 2 months ago | orderflowers; orderType: Bouquet | Do you want to send flowers or a bouquet? Oops I'm encountering a spot of trouble. Please try again later... | View Conversation |
| OrderFlowers | Incomplete | 2 months ago | orderflowers; orderType: Flowers | Do you want to send flowers or a bouquet? Oops I'm encountering a spot of trouble. Please try again later... | View Conversation |
| OrderFlowers | Incomplete | 2 months ago | orderflowers; orderType: Bouquet | Do you want to send flowers or a bouquet? Oops I'm encountering a spot of trouble. Please try again later... | View Conversation |

Page 1 (0 of 0 items) | |< < [1] > >|

Details for selected conversation checkUserDetectedLanguage → getUserIntent → startOrderFlowers → initializeCardIndex → setRangeSize → checkFlowerBouquetEntity → showOrderTypeMenu → switchOrderType → System.DefaultErrorHandler

INSIGHTS INTO PERFORMANCE OF A BOT SYSTEM

CROSS-REFERENCE TO RELATED APPLICATION

The present application is a continuation of U.S. Ser. No. 16/829,976, filed Mar. 25, 2020, entitled "INSIGHTS INTO PERFORMANCE OF A BOT SYSTEM", which is a non-provisional application of, and claims the benefit and priority of U.S. Provisional Application No. 62/839,270, filed Apr. 26, 2019, entitled "INSIGHTS INTO PERFORMANCE OF A BOT SYSTEM". The entire contents of the aforementioned applications are incorporated herein in their entireties by reference for all purposes.

FIELD OF THE INVENTION

The present disclosure relates generally to techniques for analyzing and improving a bot system, and more particularly to an analytic system integrated with a bot system for monitoring, analyzing, visualizing, diagnosing, and improving the performance of the bot system.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

BRIEF SUMMARY

Techniques are provided (e.g., a method, a system, non-transitory computer-readable medium storing code or instructions executable by one or more processors) for monitoring, analyzing, visualizing, diagnosing, and improving the performance of the bot system.

According to some embodiments, an analytic system may monitor events occurred in conversations between end users and the bot system, aggregate and analyze the collected events, and provide information regarding the conversations graphically on a graphic user interface as insights reports at different generalization levels, such as from an overall summary of all conversations to different categories of conversations, and down to individual conversations. For example, the graphic user interface may display options to filter or select certain types of conversations or individual conversations, and display information regarding the selected types of conversations or individual conversations graphically, for example, by visualizing the paths of conversations. The insights reports offer developer-oriented analytics to pinpoint issues with skills so a user can address them before they cause problems. The insights let a user track conversation trends over time, identify execution paths, determine the accuracy of their intent resolutions, and access entire conversation transcripts. The analytic system may also provide suggestions, options, or other information for improving the training of the bot system.

In some embodiments, a graphical user interface (GUI) may display information related to individual and/or aggregated end user conversations or other interactions with a bot system as paths that include different nodes representing different stages or states of the conversations. For example, end user conversations with the bot system may be represented by paths showing the transitions from state to state, where each state may be represented by a node on the path. Statistics of the user conversations with the bot system may be generated and displayed graphically through the GUI. The visualization of conversations as paths by the analytic system may allow an administrator or developer of the bot system to filter or select groups of conversations with the bot system based on different criteria. The analytic system may also provide options for the administrator or developer of the bot system to select and review individual conversations of interest. The visualized path information may allow the administrator or developer of the bot system to visually monitor and analyze how end users are interacting with the bot system and how the bot system performs during the conversations with the end users to identify underperforming elements of and possible improvements to the bot system.

Thus, the analytic system may provide, through a graphic user interface, information regarding end user conversations with the bot system at different generalization levels, including all conversations, groups of conversations meeting certain criteria, conversations associated with specific intents or end states, and individual conversations. As such, the analytic system may allow the administrator or developer of the bot system to identify specific end user utterances and end user intents associated with incomplete or unsuccessful conversations, thus identifying and improving underperforming elements of the bot system. By analyzing and improving the performance of the bot system, user experience from interactions with the bot system may be improved.

In certain embodiments, a system may include an event collector, an analytic engine, and a graphic user interface server communicatively coupled to the analytic engine. The event collector may be configurable to collect one or more attributes for one or more events associated with a set of conversations with a bot system. The analytic engine may be configured to use one or more filtering criteria selected by a user to select one or more conversations from the set of conversations based upon the one or more attributes for the one or more events and generate one or more insights reports for the selected one or more conversations. The graphic user interface (GUI) server may be configured to display, graphically on a GUI, a first report from the one or more insights reports and one or more user-selectable items associated with the first report, where the one or more user-selectable items may include at least one element of the first report, and at least one of the one or more user-selectable items may correspond to a filtering criterion of the one or more filtering criteria. The GUI server may also receive a user selection of the one or more user-selectable items, and display, graphically on the GUI based upon the user selection, a second report from the one or more insights reports.

In certain embodiments, a computer-implemented method may include collecting, by an event collector of an analytic system, one or more attributes for one or more events associated with a set of conversations with a bot system; selecting, by an analytic engine of the analytic system using one or more filtering criteria selected by a user, one or more conversations from the set of conversations based upon the one or more attributes for the one or more events; and generating, by the analytic engine of the analytic system, one or more insights reports for the selected one or more conversations. The computer-implemented method may also include displaying, graphically on a GUI, a first report from the one or more insights reports and one or more user-selectable items associated with the first report, where the one or more user-selectable items may include at least one element of the first report, and at least one of the one or more user-selectable items corresponds to a filtering criterion of the one or more filtering criteria. The computer-implemented method may further include receiving a user selection of the one or more user-selectable items through the GUI, and displaying a second report from the one or more insights reports graphically on the GUI based upon the user selection. In some embodiments, the computer-implemented method may also include receiving a user input through a user-selectable item of the one or more user-selectable items, and training the bot system based upon the user input.

In certain embodiments, a system may include one or more processors, and a memory coupled to the one or more processors and storing instructions. The instructions, when executed by the one or more processors, may cause the system to collect, by an event collector of the system, one or more attributes for one or more events associated with a set of conversations with a bot system; select, by an analytic engine of the system using one or more filtering criteria selected by a user, one or more conversations from the set of conversations based upon the one or more attributes for the one or more events; and generate, by the analytic engine, one or more insights reports for the selected one or more conversations. The instructions may also cause the system to display, graphically on a GUI, a first report from the one or more insights reports and one or more user-selectable items associated with the first report, where the one or more user-selectable items may include at least one element of the first report, and at least one of the one or more user-selectable items may correspond to a filtering criterion of the one or more filtering criteria.

In certain embodiments a method is provided that comprises collecting, by an event collector of an analytic system, one or more attributes for one or more events associated with a set of conversations with a bot system; selecting, by an analytic engine of the analytic system using one or more filtering criteria selected by a user, one or more conversations from the set of conversations based upon the one or more attributes for the one or more events; generating, by the analytic engine of the analytic system, an aggregated path diagram for the selected one or more conversations, the aggregated path diagram including a plurality of nodes and a plurality of connections among the plurality of nodes, wherein: each node of the plurality of nodes corresponds to a respective state of the bot system during the one or more conversations, wherein the state of each node names a component of the bot system that provides functionality needed at that point in the one or more conversations; and each connection of the plurality of connections represents a transition from one state of the bot system to another state of the bot system during the one or more conversations; and displaying, graphically on a GUI, the aggregated path diagram, wherein the displaying the aggregated path diagram provides a user context for the state of the bot system during the one or more conversations at each node, and wherein the context includes the state of nodes that immediately precede other nodes within the aggregated path diagram and the component defined for each state in the aggregated path diagram.

In some embodiments, the one or more filtering criteria include an incomplete outcome; the attributes are dialog state attributes, intent resolution attributes, entity resolution attributes, error and timeout attributes, or a combination thereof; and the displaying the aggregated path diagram comprises: displaying each node of the plurality of nodes as a user-selectable item, and displaying a node of the plurality of nodes that indicates a stopping point for the one or more conversations, which resulted in the incomplete outcome.

In some embodiments, the method further comprises: receiving, through the GUI, a first user selection of the node that indicates the stopping point; and displaying, graphically on the GUI based upon the first user selection, one or more utterances received by the bot system prior to stopping the one or more conversation.

In some embodiments, the method further comprises: displaying, graphically on the GUI based upon the first user selection, a user selectable item for one or more transcripts of the one or more conversations; receiving, through the GUI, a second user selection of the one or more transcripts of the one or more conversations; and displaying, graphically on the GUI based upon the second user selection, the one or more transcripts of the one or more conversations between the user and the bot system prior to stopping the one or more conversation.

In some embodiments, the method further comprises training, by the analytic system, the bot system based upon at least upon the one or more utterances received by the bot system prior to stopping the one or more conversation.

In some embodiments, the aggregated path diagram includes a number associated with each respective connection, wherein the number indicates a total number of conversations of the one or more conversations that include the transition represented by the respective connection.

In some embodiments, the method further comprises: generating, by the analytic engine of the analytic system, one or more reports for the selected one or more conversations; displaying, graphically on the GUI, a first report from the one or more reports and one or more user-selectable items associated with the first report, wherein the one or more user-selectable items include a menu for selecting conversations associated with a particular end user intent from the set of conversations; receiving, through the GUI, a user selection of a conversation of the conversations associated with the particular end user intent from the set of conversations; and displaying, graphically on the GUI based upon the user selection, a second report from the one or more reports comprising the conversation.

In certain embodiments, a non-transitory computer-readable memory is provided for storing a plurality of instructions executable by one or more processors, the plurality of instructions comprising instructions that when executed by the one or more processors cause the one or more processors to perform processing comprising: collecting, by an event collector of an analytic system, one or more attributes for one or more events associated with a set of conversations with a bot system; selecting, by an analytic engine of the analytic system using one or more filtering criteria selected by a user, one or more conversations from the set of conversations based upon the one or more attributes for the one or more events; generating, by the analytic engine of the analytic system, an aggregated path diagram for the selected one or more conversations, the aggregated path diagram including a plurality of nodes and a plurality of connections among the plurality of nodes, wherein: each node of the plurality of nodes corresponds to a respective state of the bot system during the one or more conversations, wherein the state of each node names a component of the bot system that provides functionality needed at that point in the one or more conversations; and each connection of the plurality of connections represents a transition from one state of the bot system to another state of the bot system during the one or more conversations; and displaying, graphically on a GUI, the aggregated path diagram, wherein the displaying the aggregated path diagram provides a user context for the state of the bot system during the one or more conversations at each node, and wherein the context includes the state of nodes that immediately precede other nodes within the aggregated path diagram and the component defined for each state in the aggregated path diagram.

In some embodiments, the one or more filtering criteria include an incomplete outcome; the attributes are dialog state attributes, intent resolution attributes, entity resolution attributes, error and timeout attributes, or a combination thereof; and the displaying the aggregated path diagram comprises: displaying each node of the plurality of nodes as a user-selectable item, and displaying a node of the plurality of nodes that indicates a stopping point for the one or more conversations, which resulted in the incomplete outcome.

In some embodiments, the processing further comprises: receiving, through the GUI, a first user selection of the node that indicates the stopping point; and displaying, graphically on the GUI based upon the first user selection, one or more utterances received by the bot system prior to stopping the one or more conversation.

In some embodiments, the processing further comprises: displaying, graphically on the GUI based upon the first user selection, a user selectable item for one or more transcripts of the one or more conversations; receiving, through the GUI, a second user selection of the one or more transcripts of the one or more conversations; and displaying, graphically on the GUI based upon the second user selection, the one or more transcripts of the one or more conversations between the user and the bot system prior to stopping the one or more conversation.

In some embodiments, the processing further comprises training, by the analytic system, the bot system based upon at least upon the one or more utterances received by the bot system prior to stopping the one or more conversation.

In some embodiments, the aggregated path diagram includes a number associated with each respective connection, wherein the number indicates a total number of conversations of the one or more conversations that include the transition represented by the respective connection.

In some embodiments, the processing further comprises: generating, by the analytic engine of the analytic system, one or more reports for the selected one or more conversations; displaying, graphically on the GUI, a first report from the one or more reports and one or more user-selectable items associated with the first report, wherein the one or more user-selectable items include a menu for selecting conversations associated with a particular end user intent from the set of conversations; receiving, through the GUI, a user selection of a conversation of the conversations associated with the particular end user intent from the set of conversations; and displaying, graphically on the GUI based upon the user selection, a second report from the one or more reports comprising the conversation.

In certain embodiments, a system is provided that comprises: one or more processors; and a memory coupled to the one or more processors, the memory storing a plurality of instructions executable by the one or more processors, the plurality of instructions comprising instructions that when executed by the one or more processors cause the one or more processors to perform processing comprising: collecting, by an event collector of an analytic system, one or more attributes for one or more events associated with a set of conversations with a bot system; selecting, by an analytic engine of the analytic system using one or more filtering criteria selected by a user, one or more conversations from the set of conversations based upon the one or more attributes for the one or more events; generating, by the analytic engine of the analytic system, an aggregated path diagram for the selected one or more conversations, the aggregated path diagram including a plurality of nodes and a plurality of connections among the plurality of nodes, wherein: each node of the plurality of nodes corresponds to a respective state of the bot system during the one or more conversations, wherein the state of each node names a component of the bot system that provides functionality needed at that point in the one or more conversations; and each connection of the plurality of connections represents a transition from one state of the bot system to another state of the bot system during the one or more conversations; and displaying, graphically on a GUI, the aggregated path diagram, wherein the displaying the aggregated path diagram provides a user context for the state of the bot system during the one or more conversations at each node, and wherein the context includes the state of nodes that immediately precede other nodes within the aggregated path diagram and the component defined for each state in the aggregated path diagram.

In some embodiments, the one or more filtering criteria include an incomplete outcome; the attributes are dialog state attributes, intent resolution attributes, entity resolution attributes, error and timeout attributes, or a combination thereof; and the displaying the aggregated path diagram comprises: displaying each node of the plurality of nodes as a user-selectable item, and displaying a node of the plurality of nodes that indicates a stopping point for the one or more conversations, which resulted in the incomplete outcome.

In some embodiments, the processing further comprises: receiving, through the GUI, a first user selection of the node that indicates the stopping point; and displaying, graphically on the GUI based upon the first user selection, one or more utterances received by the bot system prior to stopping the one or more conversation.

In some embodiments, the processing further comprises: displaying, graphically on the GUI based upon the first user selection, a user selectable item for one or more transcripts of the one or more conversations; receiving, through the GUI, a second user selection of the one or more transcripts of the one or more conversations; and displaying, graphically on the GUI based upon the second user selection, the one or more transcripts of the one or more conversations between the user and the bot system prior to stopping the one or more conversation.

In some embodiments, the processing further comprises training, by the analytic system, the bot system based upon at least upon the one or more utterances received by the bot system prior to stopping the one or more conversation.

In some embodiments, the aggregated path diagram includes a number associated with each respective connection, wherein the number indicates a total number of conversations of the one or more conversations that include the transition represented by the respective connection.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 4A-4C depict examples of a graphical user interface screen displaying digital assistant insights for improving a bot system according to various embodiments.

FIGS. 5A-5E depict examples of a graphical user interface screen displaying line of business insights for improving a bot system according to various embodiments.

FIGS. 7A-7I depict examples of a graphical user interface screen displaying exemplary insights for improving a bot system according to various embodiments.

DETAILED DESCRIPTION

Figure 1:
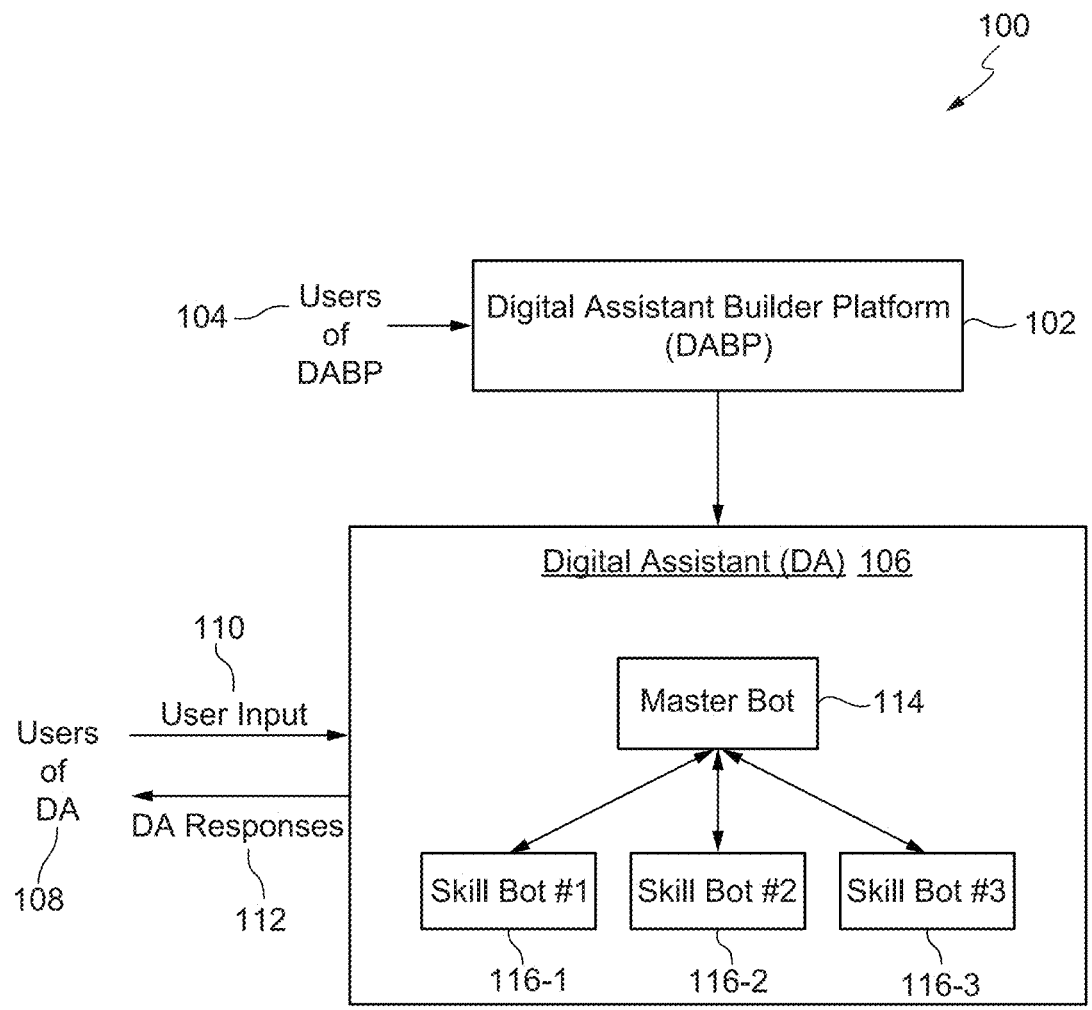
FIG. 1 depicts a distributed system that implements a bot system for communicating with end users using a messaging application in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

INTRODUCTION

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

However, building a chatbot that can determine the end users' intents based upon user utterances, is a challenging task in part due to the subtleties and ambiguity of natural languages and the dimension of the input space (e.g., possible user utterances) and the size of the output space (number of intents). As such, the chatbot may need to be trained, monitored, debugged, and retrained in order to improve the performance of the chatbot and user experience with the chatbot. In conventional systems, training models are provided that are essentially default training models hard coded into the design system for training and retraining the digital assistant or chatbot. For example, a first model may be provided that only needs a small training corpus, so it may use matching rules to develop entities, intents, and the training corpus. When the training corpus has matured to the point where tests reveal highly accurate intent resolution, a second model may be used to add a deeper dimension to the chat bot's cognition by training using machine learning based on word vectors and other text-based features. These default training models are typically inflexible in the training methodology employed. Thus, it may be difficult to identify the root causes of lower than desired performance of the chatbot and determine how to improve the chatbot without a more flexible approach to training.

An analytic system may be integrated with a bot system to monitor events that occurred during conversations between end users and the bot system, aggregate and analyze the collected events, and provide information to a user based on the analysis that can be used to improve on performance of the bot system including performance of the intent classification. However, (i) these systems do not typically identify the root cause of the lower than desired performance (instead they provide information such as bot A failed to identify a intent x amount of times over a period n), and it's up to the customer to identify the root cause of the problem from the information, and (ii) these types of analytic systems can become ineffective when hundreds or thousands of bots are being employed within a bot system.

Accordingly, a different approach is needed to address these problems. In various embodiments, an analytic system may be integrated with a bot system. The analytic system may gather conversation logs and history, and determine information related to individual and/or aggregated end user conversations with a bot system as paths that include different nodes representing different stages or states of the conversations. For example, end user conversations with the bot system may be represented by paths showing the transitions from state to state, where each state may be represented by a node on the path. Statistics of the user conversation with the bot system may be generated for each node. The paths include (i) a number of conversations flowed through the intent-specific paths of the dialog flow for a given period, (ii) the number of conversations maintained between each state and the different execution paths taken because the conversation branched due to values getting set (or not set), or dead-ended because of some other problem like a malfunctioning custom component, and (iii) a final state that provides insight into the conversation's ultimate success or failure. The analytical tool may then use the information generated for each path and node to retrain the bot system or individual bot responsible for the intent/path.

In some embodiments, an event collector of the analytic system may collect one or more attributes for one or more events associated with a set of conversations with a bot system. The event collector may be reconfigurable to selectively collect desired attributes for desired events. The one or more events may include, for example, at least one of a conversation event, a bot state event, an intent resolution event, an entity resolution event, an error event, a timeout event, or a custom event. Thereafter, the analytic engine of the analytic system may select, using one or more filtering criteria selected by a user, one or more conversations from the set of conversations based upon the one or more attributes for the one or more events collected by the event collector. The one or more filtering criteria may include, for example, conversations ended at a particular state, conversations started from a particular state, completed or incomplete conversations, conversations associated a particular end user intent, conversations from a particular channel or locale, conversations occurred during a certain time period, and the like. For the selected one or more conversations, the analytic engine may calculate statistics of the set of conversations, statistics of the conversations associated with a particular end user intent, statistics of complete conversations, statistics of incomplete conversations, statistics of conversations for which no end user intent is determined, or any combination thereof. The analytic engine may generate options for improving the bot system based on the calculated statistics.

In some embodiments, the analytic engine may generate an aggregated path diagram for the selected one or more conversations. The aggregated path diagram may include a plurality of nodes and a plurality of connections among the plurality of nodes. Each of the plurality of nodes may correspond to a respective state of the bot system. Each of the plurality of connections may represent a transition from one state of the bot system to another state of the bot system. The plurality of nodes may include a start node and an end node. In some embodiments, the aggregated path diagram may include a number associated with each respective connection, where the number may indicate a total number of conversations that include the transition represented by the respective connection.

The analytic engine may incorporate the statistics into the aggregate path diagram to determine additional information such as how many conversations flowed through the intent-specific paths of the dialog flow for a given period, the number of conversations maintained between each state, and the different execution paths taken because the conversation branched due to values getting set (or not set), or dead-ended because of some other problem like a malfunctioning custom component. Optionally, the bot system may be retrained using the statistics and aggregated path diagram to improve the performance of the bot system, such as retraining the intent classification models of the bot system to more accurately determining the user intents.

In some embodiments, a graphical user interface (GUI) may display information related to individual and/or aggregated end user conversations with a bot system as paths that include different nodes representing different stages or states of the conversations. For example, end user conversations with the bot system may be represented by paths showing the transitions from state to state, where each state may be represented by a node on the path. Statistics of the user conversation with the bot system may be generated and displayed graphically through the GUI. The path visualization by the analytic system may allow an administrator or developer to filter or select groups of end user conversations with the bot system based on different criteria. The analytic system may also provide options for the administrator or developer of the bot system to select and review individual conversations of interest. The visualized path information may allow an administrator or developer of the bot system to visually monitor and analyze how end users are interacting with the bot system and how the bot system performs during the conversations to identify underperforming elements of and possible improvements to the bot system.

As described above, the analytic system may provide, through a GUI, information regarding end user conversations with the bot system at different generalization levels, including all conversations, conversations meeting certain criteria, conversations associated with specific intents or end states, and individual conversations. As such, the analytic system may allow the administrator or developer of the bot system to identify specific end user utterances and intents associated with incomplete or unsuccessful conversations, thus identifying and improving underperforming elements of the bot system. By analyzing and improving the performance of the bot system, end user experience with the bot system may be improved.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of a distributed environment 100 incorporating an exemplary embodiment. Distributed environment 100 comprises a digital assistant builder platform (DABP) 102 that enables enterprises to create and deploy digital assistants for their users. For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. DABP 102 can be used to create one or more digital assistants (or DAs) 106. DABP 102 can be used by multiple enterprises to create digital assistants for their users. For example, as shown in FIG. 1, user 104 representing a particular enterprise can use DABP 102 to create and deploy a digital assistant 106 for users of the particular enterprise. For example, an owner of a restaurant (e.g., a pizza shop) may use DABP 102 to create and deploy a digital assistant that enables customers of the restaurant to order food (e.g., order pizza).

Once a digital assistant 106 is deployed, users 108 may use the digital assistant 106 to perform various tasks via natural language-based conversations with the digital assistant 106. As part of a conversation, a user 108 may provide one or more user inputs 110 and get responses 112 back from the digital assistant 106. Via these conversations, a user can request one or more tasks to be performed by the digital assistant 106 and, in response, the digital assistant 106 is configured to perform the user-requested tasks and respond with appropriate responses to the user.

User inputs 110 are in a natural language and are referred to as utterances. A user utterance can be in text form (e.g., when the user types something as input to digital assistant 106) or in audio input or speech form (e.g., when the user says something as input to digital assistant 106). The utterances are typically in a language spoken by the user 108. When a user input 110 is in speech form, the speech input is converted to text form utterances in that particular language and the text utterances are then processed by digital assistant 106. Various speech-to-text processing techniques may be used to convert a speech or audio input to a text utterance, which is then processed by digital assistant 106.

A text utterance, input by the user 108 or generated from converting speech input to text form, can be a text fragment, a sentence, multiple sentences, and the like. Digital assistant 106 is configured to apply natural language understanding (NLU) techniques to the text utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents.

For example, the user input 110 may request a pizza to be ordered, for example, "I want to order a pizza." Digital assistant 106 is configured to understand the meaning of the utterance and take appropriate actions that may involve responding to the user with questions requesting user input on the type of pizza the user desires to order, the size of the pizza, any toppings for the pizza, and the like. The responses 112 provided by digital assistant 106 may also be in the form of natural language, which may involve natural language generation (NLG) processing performed by digital assistant 106. Once digital assistant 106 has the requisite information from the user, digital assistant 106 may then cause a pizza to be ordered. Digital assistant 106 may end the conversation with the user by outputting information indicating that the pizza has been ordered.

In certain embodiments, an utterance received as input by digital assistant 106 goes through a series or pipeline of processing steps. These steps may include, for example, parsing the utterance, understanding the meaning of the utterance, refining and reforming the utterance to develop a better understandable structure for the utterance, determining an action to be performed in response to the utterance, causing the action to be performed, generating a response to be output to the user responsive to the user utterance, outputting the response to the user, and the like.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). A digital assistant 106 may use a NLP engine and/or a machine learning model (e.g., an intent classifier) to map end user utterances to specific intents (e.g., specific task/action or category of task/action that the chatbot can perform). For example, a machine learning based NLP engine may learn to understand and categorize the natural language conversations from the end users and to extract necessary information from the conversations to be able to take precise actions, such as performing a transaction or looking up data from a backend system of record. In certain embodiments, the NLU processing or portions thereof is performed by digital assistant 106 itself. In some other embodiments, digital assistant 106 may use other resources to perform portions of the NLU processing. For example, the syntax and structure of a sentence may be identified by processing the sentence using a parser, a part-of-speech tagger, and/or a named entity recognizer. In one implementation, for the English language, a parser, a part-of-speech tagger, and a named entity recognizer provided by the Stanford Natural Language Processing (NLP) Group is used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. In certain embodiments, digital assistant 106 provides subsystems (e.g., component implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server, and can also take advantage of the generic subsystems provided, if needed.

A digital assistant, such as digital assistant 106, can be made available to its users through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant contains or is associated with one or more skills. In certain embodiments, these skills are individual chatbots (referred to as skill bots) that are designed to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant 106 includes skills 116-1, 116-2, and so on. For purposes of this disclosure, the terms "skill" and "skills" are used synonymously with the terms "skill bot" and "skill bots" respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as the "skills store") that offers multiple skills directed to a wide range of tasks. The skills offered through the skills store may expose various cloud services. A user 104 of DABP 102 can access the skills store via DABP 102, select a desired skill and add the selected scale to a digital assistant created using DABP 102. A scale from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

In certain embodiments, a digital assistant created and deployed using DABP 102 is implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 itself acts as the master bot.

A digital assistant implemented according to the master-child bot architecture enables users of the digital assistant to interact with multiple skills through a unified user interface. When a user engages with a digital assistant 106, the user input is received by the master bot 114, which then processes the user input to identify a user request and based upon the processing determines whether the user request task can be handled by the master bot 114 itself, else the master bot 114 selects an appropriate skill bot 116-1, 2, or 3 for handling the user request and routes the conversation to the selected skill bot 116-1, 2, or 3. This enables a user 108 to, through a common single interface, converse with and use several skill bots configured to perform specific tasks. For example, for a digital assistant 106 developed for an enterprise, the master bot 114 of the digital assistant 106 may interface with skill bots 116-1, 116-2, etc. with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer 108 of the digital assistant 106 need only know how to access the digital assistant 106.

In a master bot/child bot infrastructure, the master bot is configured to be aware of the list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to identify or predict a specific skill bot, from the multiple available skill bots, that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a use of DABP 102 to create a digital assistant including one or more skill bots associated with the digital assistant. For example, a skill bot can be created by cloning an existing skill bot, cloning an existing skill bot and then making modifications to the skill bot, or can be created from scratch using tools and services offered by DABP 102. In certain embodiments, DABP 102 provides a skills store or skills catalog offering multiple skill bots for performing various tasks. A user of DABP 102 can clone a skill bot from the skills store and create a new skill bot.

DABP 102 also enables a user (e.g., a skill bot designer) to create a skill bot from scratch. In certain embodiments, at a high level, creating a skill bot involves the following steps:

(1) Configuring settings for a new skill bot
    (2) Configuring one or more intents for the skill bot
    (3) Configuring entities for one or more intents
    (4) Training the skill bot
    (5) Creating a dialog flow for the skill bot
    (6) Adding custom components to the skill bot
    (7) Testing and deploying the skill bot (1) Configuring settings for a new skill bot—A skill bot designer can specify one or more invocation names for the skill bot being created. These invocation names can be used in utterances to explicitly identify and invoke the skill bot in the digital assistant. The skill bot designer may also specify example utterances for the skill bot. These example utterances are representative of utterances for the skill bot. When user inputs are received, the intent analysis engine of the digital assistant compares the user inputs to these example utterances to determine if the particular skill bot is to be invoked.

(2) Configuring one or more intents for the skill bot—The skill bot designer may configure one or more intents (also referred to as bot intents) for a skill bot being created. These intents identify tasks that the skill bot can perform for users of the digital assistant. Each intent is given a name. For example, for a skill bot configured to help users perform various banking transactions, intents may be specified by the skill bot designer for the skill bot such as "CheckBalance," "TransferMoney," "DepositCheck," and the like. For each intent, the skill bot designer specifies a set of example utterances that are representative of and illustrate the meaning of the intent and are typically associated with the task performed by that intent. For example, for the CheckBalance intent, example utterances may include "What's my savings account balance?", "How much is in my checking account?", "How much money do I have in my account," and the like. Accordingly, permutations of typical user requests and statements may be specified as example utterances for an intent.

(3) Configuring entities for one or more intents of the skill bot—In some instances, additional context may be needed to enable the skill bot to properly respond to a user request. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill example, an entity called AccountType, which defines values called "checking" and "saving" may enable the skill bot to parse the user request and respond appropriately. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input, parse or otherwise process the received input, and identify or select an intent that is relevant to the received user input. In order for this to happen, the skill bot has to be trained. In certain embodiments, a skill bot is trained based upon the intents configured for the skill bot and the example utterances associated with the intents (collectively, the training data), so that the skill bot can resolve user input to one of its configured intents. In certain embodiments, a skill bot is represented by a model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof, as described in detail herein with respect to DAG based framework. In certain embodiments, a portion (e.g., 80%) of the training data is used to train a skill bot model and another portion (e.g., the remaining 20%) is used to test or verify the model. Once trained, the skill bot can then be used to handle and respond to user utterances. In certain cases, a user's utterance may be a question that requires only a single answer and no further conversation. In order to handle such situations, a Q&A (question-and-answer) intent may be configured for a skill bot. This enables a skill bot to output replies to user requests without having to update the dialog definition. Q&A intents are created in a similar manner as regular intents. The dialog flow for Q&A intents is however different from regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take (e.g., how the skill bot responds to user utterances, how the skill bot prompts users for input, how the skill bot returns data). The dialog flow is like a flowchart followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot names components that provide the functionality needed corresponding to the states. Components enable a skill bot to perform the functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stored information about the one or more skill bots associated with the digital assistant.

At the master bot or digital assistant level, when a user inputs a phrase or utterance to the digital assistant, the digital assistant is configured to perform processing to determine how to route the conversation. The digital assistant determines this using a routing model, which can be rules-based, AI-based, or a combination thereof. The digital assistant uses the routing model to determine whether the conversation corresponding to the user input is to be routed to a particular skill for handling, is to be handled by the digital assistant or master bot itself per a built-in system intent, or is to be handled as a different state in a current conversation flow.

In certain embodiments, as part of this processing, the digital assistant determines if the user input identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific invocation, in certain embodiments, the digital assistant evaluates the received user input and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input. In certain embodiments, after one or more skill bots are identified as candidates, the intents associated with those candidate skills are evaluated (according to the intent model for each skill) and confidence scores are applied to each intent. In general, any intent that has a confidence score exceeding a threshold value is treated as a candidate flow. If a particular skill bot is selected, then the user input is routed to that skill bot for further processing. If a system intent is selected, then one or more actions are performed according to the selected system intent.

Figure 2:
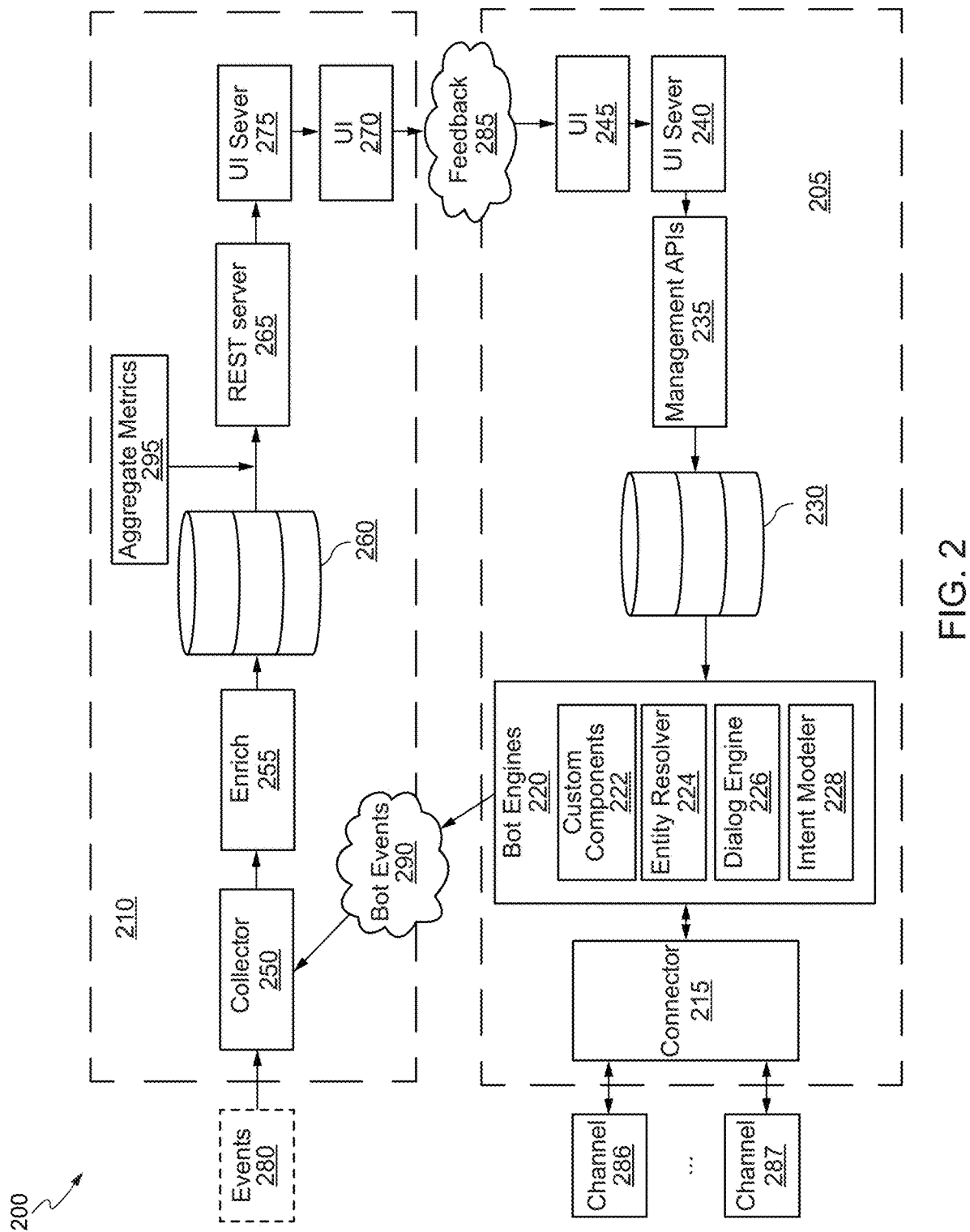
FIG. 2 depicts an integrated system including a bot system and a bot analytic system for monitoring, analyzing, visualizing, and improving the performance of a bot system in accordance with various embodiments.

FIG. 2 depicts an integrated system 200 including a bot system (such as digital assistant or bot system 106 as described with respect to FIG. 1) and a bot analytic system 210 for monitoring, analyzing, visualizing, and improving the performance of the bot system according to certain embodiments. As illustrated, the bot system 205 may include a connector 215 and a plurality of bot engines 220, such as a dialog engine 222, an intent modeler 224, an entity resolver 226, and custom components 228. The bot system 205 may also include a database 230, management APIs 235, a user interface 240, and a UI server 245. The bot analytic system 210 may include a collector 250, an enrichment engine 255, a database 260, and a REST server 265. The bot analytic system 210 may also include a user interface 270 and a UI server 275. Collector 250 of the bot analytic system 210 may collect events 290 occurred at the bot system 205. Feedback 285 from the bot analytic system 210 may be provided to the bot system 205 through user interface 270 and user interface 245.

Connector 215 may act as an interface between the bot system 205 and one or more end users through one or more channels, such as channels 286 and 287. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 215 may normalize content from different channels such that the bot system 205 may analyze content across different messaging application systems. The content normalization processing may include formatting content from each type of messaging application to a common format for processing. In some embodiments, the bot system 205 may include one or more connectors for each of the channels. Intent modeler 228 may be used to determine end user intents associated with user utterances. After normalization, a probability that the occurrence of a word may signify a certain intent may be determined. In some examples, probabilities can be combined using basic probability arithmetic as if they were independent.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 224 may identify entities (e.g., objects) associated with the end user intents. For example, in addition to the end user intent identified by intent modeler 228, such as "order pizza," entity resolver 224 may resolve entities associated with the intent, such as the pizza type, toppings, and the like.

Dialog engine 226 may be used to handle the conversations between the end users and the bot system. For example, dialog engine 226 may respond to end user utterances based on the end user intent identified by intent modeler 228 and entities associated with the end user intent identified by entity resolver 224. In some embodiments, dialog engine 226 may use a state machine that includes user defined states (e.g., end user intents) and actions to take in the states or from state to state to handle the conversations with end users.

Custom components 222 may include customized modules for the specific bot system. For example, a financial bot may include custom components that may be used to, for example, checking balance, transfer funds, or pay bills.

Database 230 may be used to store data for the bot system, such as data for the classification models, logs of conversation, and the like. Management APIs 235 may be used by an administrator or developer of the bot system to manage the bot system, such as re-training the classification models, editing intents, or otherwise modifying the bot system. The administrator or developer may use user interface 245 and UI server 240 to manage the bot system.

Various events 290 may be generated while the bot system 205 is running. The events 290 may be generated based upon one or more instructions included in the bot system. For example, an event 290 may be generated when the bot system 205 has entered into a particular state, where the particular state is defined by an administrator or developer of the bot system. As events are generated, the events 290 may be collected, stored, and analyzed by the bot analytic system 210. When capturing an event 290, additional information associated with the event 290 may also be collected, where the additional information may indicate a present context in which the event 290 is generated.

For example, conversation events may be generated by dialog engine 226. A conversation event may include a message received by a bot system from an end user device (referred to as msg_received). Msg_received may include one or more of the following parameters or variables: the content of the message, the time when the message is received by the bot system 205, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system 205 to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 226 may also generate dialog state execution events. As described above, dialog engine 226 may use a state machine to determine the flow of the conversations with end users. The state machine may include a set of states and rules of transition between the states. Dialog engine 226 may execute the state machine for each end user conversation, and a dialog state execution event may be produced for each state that dialog engine 226 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 228. Intent modeler 228 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 224 may generate entity resolver events. Entities are objects associated with end user intents. Entity definition rules may be determined when the bot system is created. For example, in addition to resolving end user intents, such as "order pizza," the bot system may also use entity resolver 224 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component 222 may also generate events, such as a predefined event or a custom event. The predefined event may be a property captured at an execution of a custom component. Examples of attributes pf the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component 222 may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system 205 during execution. An error event may be generated when an error occurs. A timeout event may be generated when the end user conversation has been inactive for a period of time, which may be configured at the channel.

The bot analytic system 210 may collect the events 290 and additional information as the bot system 205 conducts conversations with end users and generates the corresponding events. For example, collector 250 may collect the events 290 and the additional information and send the collected information to a queue. In some embodiments, collector 250 may be configurable and can be programmed to collected different events and/or event attributes described above as desired. For example, collector 250 may be configured to capture dialog state attributes, intent resolution attributes, entity resolution attributes, error and timeout attributes, or a combination thereof. In some embodiments, collector 250 may also be configured to collect information regarding events 280 generated by a system other than the bot system.

Enrichment engine 255 may perform validation and enrichment on the collected events and other information and write them to database 260. For example, based on a collected IP address, enrichment engine 255 may determine the location of the end user associated with the IP address. As another example, enrichment engine 255 may extract certain features from the collected information, such as determining a web browser or channel used by the end user. REST server 265 may analyze the enriched events and other information and generate various reports based on certain aggregate metrics 295. The reports may be displayed to an owner, administrator, or developer of the bot system 205 on user interface 270 through UI server 275. The owner, administrator, or developer of the bot system 205 may provide feedback 285 to the bot system 205 for improving the bot system 205.

Techniques for Providing Insights into Performance of a Bot System

Figure 3:
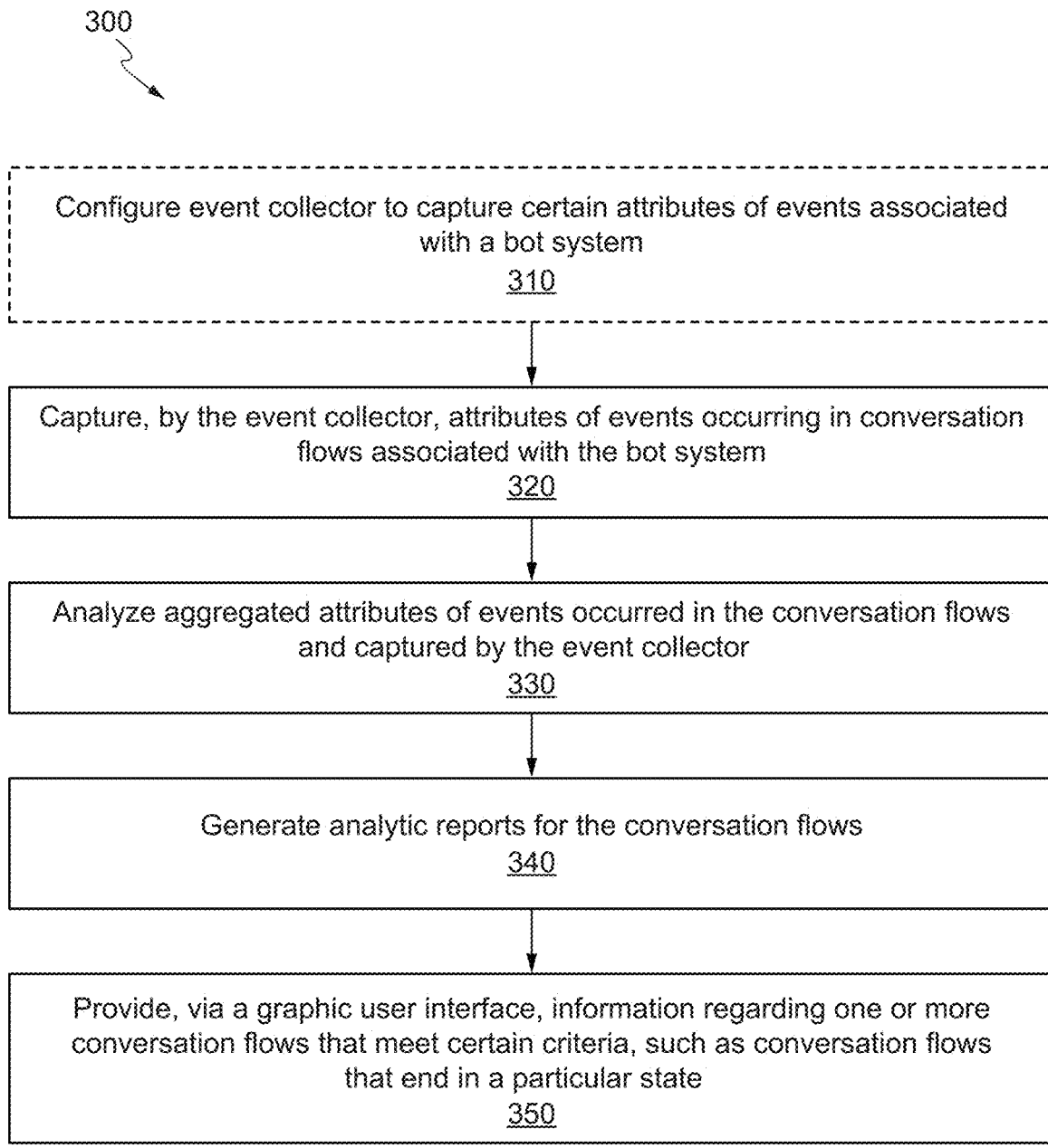
FIG. 3 is a simplified flowchart illustrating processing for monitoring, analyzing, visualizing, and improving the performance of a bot system in accordance with various embodiments.

FIG. 3 is a simplified flowchart 300 illustrating an example of processing for monitoring, analyzing, visualizing, and improving the performance of a bot system according to certain embodiments. The processing depicted in FIG. 3 may be performed by a bot analytic system, such as the bot analytic system described with respect to FIG. 2. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

At step 310, an event collector of a bot analytic system, such as collector 250 described with respect to FIG. 2, may be configured to capture certain attributes associated with certain events generated by a bot system. As described above, the events generated by the bot system may include, for example, conversation events, dialog state execution events, intent resolution events, entity resolution events, and events generated by custom components. The event collector may be configured to collect desired events or desired attributes associated with the various events. At step 320, the event collector may collect the attributes of events occurred during conversations with the bot system based on the configuration of the event collector. At step 330, the attributes of the events occurred during the conversations and captured by the event collector may be aggregated and analyzed. As described above, the attributes of the events may also be enriched and saved in a database before being aggregated based on some aggregate metrics. At step 340, various analytic insights reports may be generated for the conversations based on the aggregate metrics, such as an overview report, an intent report, a path report, a conversation report, a bot improvement report, or any combination thereof, as described in detail below. At step 350, the analytic system may provide, at the request of a bot owner, administrator, or developer, information regarding one or more conversations that meet certain criteria, such as conversations that end in a particular state (e.g., an incomplete or aborted state or an error state). The bot owner, administrator, or developer may filter or select conversations by selecting different options provided through a graphic user interface for monitoring, analyzing, visualizing, debugging, or improving the performance of the bot system.

As described above, the analytic reports may include, for example, an overview report, an intent report, a path report, a conversation report, a bot improvement report, or any combination thereof. The overview report may include, for example, a trend chart illustrating completed/incomplete conversations over time, and a bar chart showing conversation counts for each intent. The intent report may include, for example, information regarding conversations and errors for each intent, and the most popular or least popular conversation flow. The path report may include charts depicting different conversation flows for the bot system, and information such as the conversation counts and error metrics. The conversation report may show the summary of the conversation log. The bot improvement report may provide information regarding the intent classification results, which may be used by the administrator or developer of the bot system to correct some classification results and use the corrected classification results to retrain the classification models.

In some embodiments, a report may include information indicating one or more utterances from one or more end users for which an intent was not able to be identified (sometimes referred to as an unresolved intent). For example, a bot system may calculate a likelihood that a utterance or utterance from an end user is associated with an intent. If the likelihood is less than a threshold, the utterance may not be associated with the intent. If the utterance is not associated with any intent, the bot system may not be able to further a conversation. Instead, the bot system may have to ask one or more additional questions to identify the intent.

By presenting information regarding a utterance where an intent was not able to be identified, the insights reports may enable a user to reconfigure the bot system to properly identify the intent when receiving a new utterance similar to the utterance. For example, the insights reports may present one or more potential intents based upon likelihoods such that the user may select an intent from the one or more potential intents so that the utterance may be added to a training dataset used for training the classification model for identifying the intent from a utterance.

In some embodiments, a user may be presented with information regarding which conversations are successful and which conversations are not. In addition, a user may drill down into conversation data to identify errors and improve a performance of the bot system. By analyzing paths of end user conversations, one or more performance metrics may be provided for different conversation types (e.g., intents). For example, a user may view, by intent, how many conversations are successful and how many were not. In some embodiments, there may be a pre-defined threshold to determine what percentage of successful conversations is considered good, what percentage is considered medium, and what percentage is considered low. A performance metric of conversation success may be shown with a different color according to the threshold. The user may also view a source of each visit to the bot system (e.g., Facebook, webhook, etc.). A user may view a total number of conversations, a state length, a time length per intent, etc., or the like. Conversations may be grouped into pre-defined types such as abandoned and completed. A conversation metric may be filtered based upon conversation types to view a subset of conversations.

In some embodiments, the conversations may be viewed by state. A conversation flow (or path) may be a graphical visualization that includes one or more states of a conversation. In some embodiments, a path may be filtered by conversation type (e.g., abandoned, most popular, etc., or the like). In some embodiments, an error condition for a path may be viewed, for example, for a given state in the path.

In some embodiments, a metric and/or metadata may be viewed for a path. The metric may include a number of instances of the path, a length of the path, a rank in terms of popularity of the path, and an average time to complete the path.

In some embodiments, an instance of a conversation type may be viewed and analyzed via a sequence of states. In such embodiments, states and conversations may be synchronized to identify errors and performance issues.

A metric may be computed based upon one or more events described above. The metric may be computed daily, weekly, month, or a custom range. Examples of basic metrics include (1) a number of unique, total, new, active, inactive, or returning end users, (2) total sessions/conversations, (3) average, maximum, median, or minimum conversation duration, (4) average time between two conversations of an end user, (5) sentiment (positive, negative, or neutral), (6) number of end users, number of conversations, or number of unique end users, (7) average, maximum, median, or minimum utterance count, or the like. Each metric may be filtered by channel (e.g., Facebook or webhook), geography (e.g., country, state, city, or zip code), language (e.g., English or Spanish), device and its type (e.g., iPhone, Samsung, Motorola, LG, HP, or Dell), OS and its version (e.g., Windows, iOS, Android, Mac, or Linux), browser and its version (e.g., Firefox, Safari, Internet Explorer, or Chrome), app name and its version (e.g., integrated chat within an app), agent type (e.g., bot system or user device), or the like.

In some examples, a custom event from a custom component may have a custom insights report that is developed by a bot developer using customer experience analytics (CxA).

A conversation may be analyzed using a buzz graph and/or word cloud of most frequent terms used. Conversations may also be categorized with rankings for each category. A comparative buzz graph for utterances and conversations may also be used.

In some embodiments, a bot analytic system may identify what parts of a conversation with a bot system are working well and what are not. The bot analytic system may enable a user to drill down into a conversation history, track abandoned/completed intents and conversations, identify most/least popular path taken for a completed path based upon depth, time, or both, or identify a history of all abandoned conversations with transcripts to trouble-shoot why the conversations were abandoned (e.g., number of states traversed, error conditions, or the like). In some embodiments, the result generated by the bot analytic system may be filtered. The filtering may be based upon the channel, length, intent, abandoned/completed, or the like.

In the following descriptions, some examples of analytic insights reports and graphic user interface screens are described. It is noted that these examples are for illustration purposes only and are not intended to limit the scope of the present disclosure to the specific examples.

Digital Assistant Insights

Figure 4A:
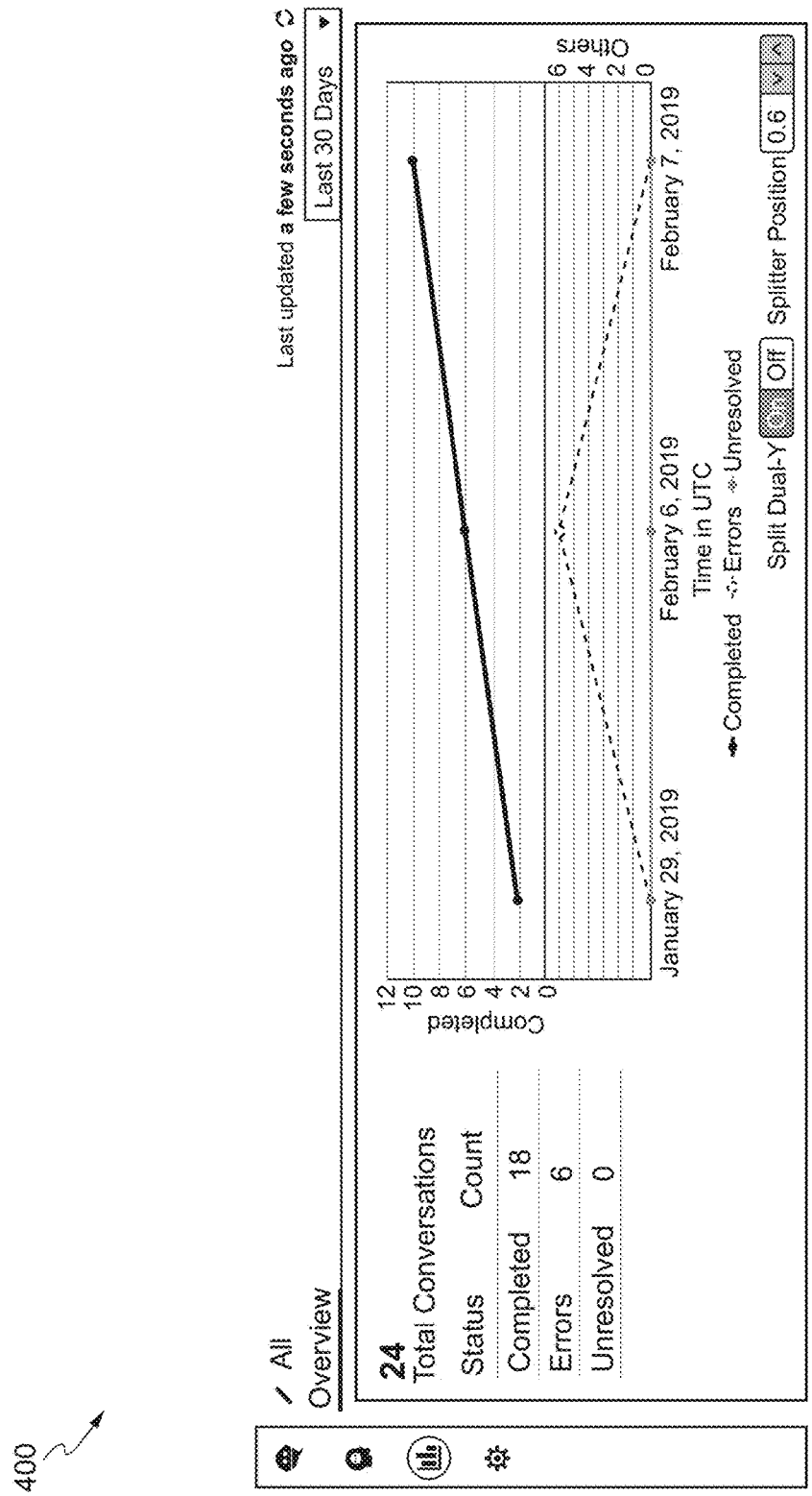

FIG. 4A depicts an example of a graphical user interface screen 400 displaying summarized information 405 of conversations associated with a digital assistant according to certain embodiments. As described herein, digital assistants are artificial intelligence driven interfaces that help users accomplish a variety of tasks in natural language conversations. For each digital assistant, one or more skills or chatbots are assembled. The one or more skills or chatbots may be focused on specific types of tasks, such as tracking inventory, submitting time cards, and creating expense reports. The summarized information 405 may be generated for conversations between a user and one or more chatbots for a digital assistant. The summarized information 405 may be associated with any channel and any locale or any combination of channels and locales. The summarized information 405 may also be generated for conversations that occurred within a specific time period, such as the last 90 days. For each digital assistant, a user can view insights reports, which are developer-oriented analytics on usage patterns. With digital assistant insights reports, a user can see: (i) total conversations—a number of conversations over a given time period and their rate of completion, and (ii) how skills are performing—popularity of the skills in the digital assistant.

To access the insights reports, a user may open a digital assistant and then select an insights icon 410 in the navigation bar, as shown in FIG. 4A. A user can also view detailed reports on individual skills that show things such as how often each intent is called (and which percentage of those calls complete) and the paths that users take through the skill, as discussed in greater detail below with respect to Skill Insights. The screenshot of the total conversations report includes the number of conversations over the range of time that a user can select. These conversations may be broken down into: completed conversations and errors (conversations that were not completed because of system-handled errors, infinite loops, or timeouts). On the left side of report is a table with columns for status and count. There are rows for completed, errors, and unresolved. On the right is a graph showing the number completed conversations and other conversations over a period of 30 days.

Figure 4B:
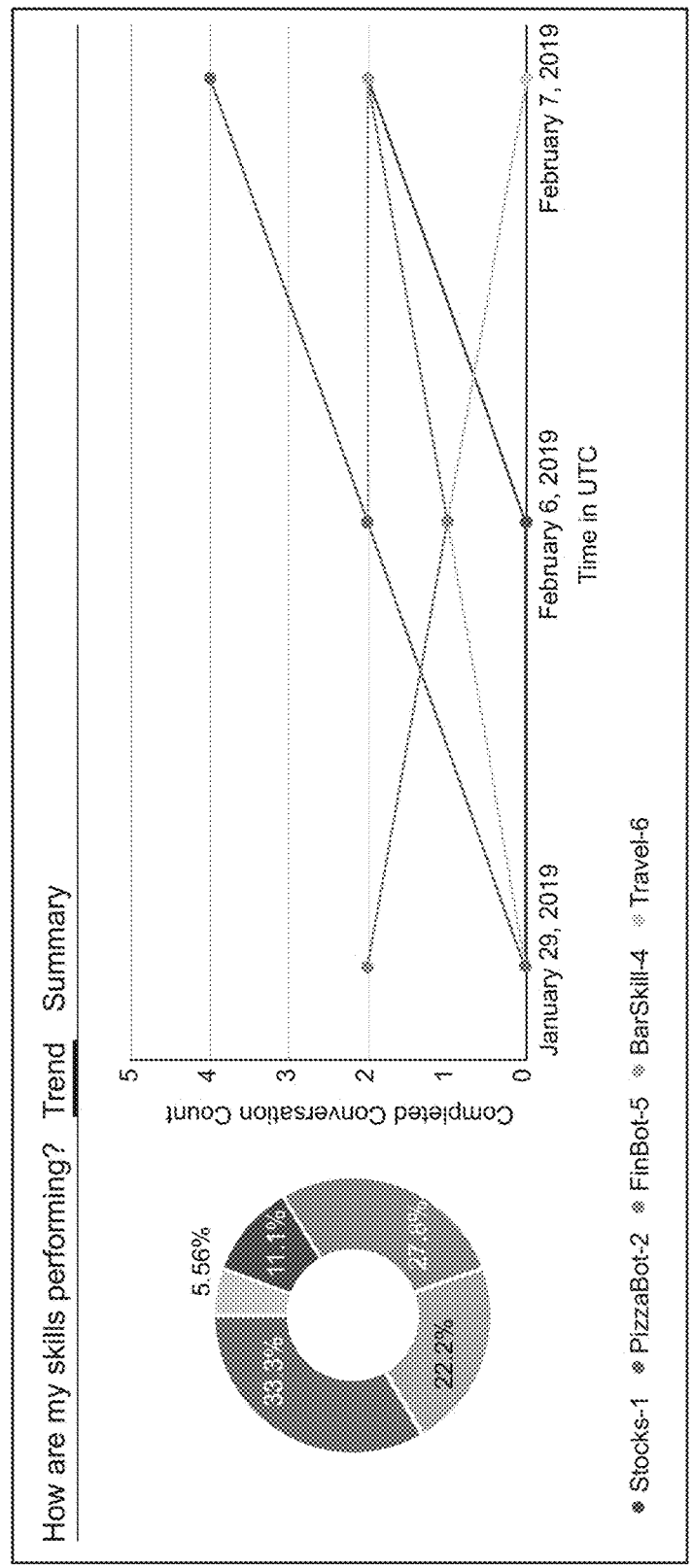

FIG. 4B shows an interface screen 415 of the trend tab of the How Are My Skills Performing report, which shows the number of conversations by skill. On the left side of interface screen 415 is a pie chart showing the percentages of conversations 420 that use each skill. On the right is a graph showing the number completed conversations for each skill over a period of 30 days. FIG. 4C shows an interface screen 425 of the summary tab of the How Are My Skills Performing report, which shows the number of each skill's completed conversations, unresolved conversations, and errors. The interface screen 425 contains a table with columns for skill, completion rate, errors, unresolved, and performance history.

Line of Business Insights

Figure 5A:
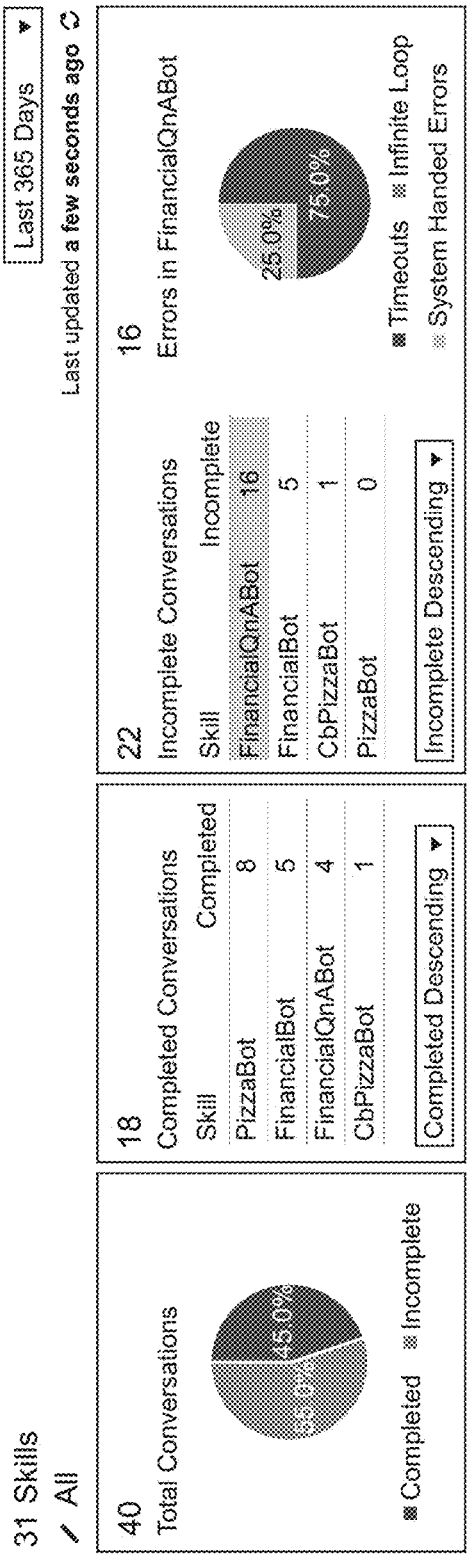

FIG. 5A depicts an example of a graphical user interface screen 500 displaying summarized information of conversations associated with a digital assistant according to certain embodiments. These dashboard insights reports can be used to gauge how well an enterprises' published skills complete conversations both on an individual basis and as a group. More specifically, the reports can be uses to return the following key performance indicators (KPIs) for all of the skills currently in production by a given enterprise (or a selection of those skills) for a given period: (i) Total Conversations—the overall number of conversations, segmented by completed or incomplete, (ii) Completed Conversations—A ranking of the selected skills by the number of completed conversations, and (iii) Incomplete Conversations—A ranking of the selected skills by the number of incomplete conversations. Customers may not have completed these conversations because they lost interest, or because they were blocked by errors handled by the system (not the skill itself), timeouts, or infinite loops caused by flaws in the skill definition. For each skill, the report provides an overall count of timeouts, system-handled errors, and infinite loops for the period. To illustrate how much these factors contributed to a skill's overall failure, the report renders a pie chart.

The interface screen 500 shows a Total Conversations report that's part of the Line of Business Insights. This report is comprised for four panels, which from left to right, are Total Conversations, Completed Conversations, Incomplete Conversations, and Errors. Total Conversations Conversation is a pie chart comparing the Completed and Incomplete data series. Completed Conversations, display a list of skills ranked by the number of completed conversations. A user can sort this list using the Completed Descending and Completed Ascending options. Incomplete Conversations also has a list of skills, but here they're ranked by the number of incomplete conversations. A user can also sort this list using the Completed Descending and Completed Ascending options. Adjacent to this list is the Errors pie chart, which compares the data series for Timeouts, Infinite Loops, and System-Handled Errors.

FIG. 5B depicts an interface screen 505 that shows a how are my skill performing report that's part of the Line of Business Insights. In the interface screen 505, the Individual Skills tab is selected. This report displays a set of rows (one for each skill) which have the following columns (left to right): Skill, Completion Rate, Errors, Unresolved Intents, Performance History. At the top-left of the report is the sorting options drop down menu. In this image, Total Ascending is selecting. This report can be used to see the conversation completion rate for all of the skills for selected period and on a per-skill basis. More specifically, this report can be used to find out how the skills compare to one another in terms of the completion rate, the number completed conversations taken against the total conversations for the period. For each skill, the report renders a Performance History line chart, a tool for assessing if the skill's completion rate has increased, decreased, or remained stable for the period. The report includes other factors that influence the skill's performance during this period: the number of errors (system-handled errors, infinite loops, timeouts) and unresolved intents. For these, the report counts the number of intents that couldn't resolve to the confidence threshold for all of incomplete conversations during the period.

Figure 5C:
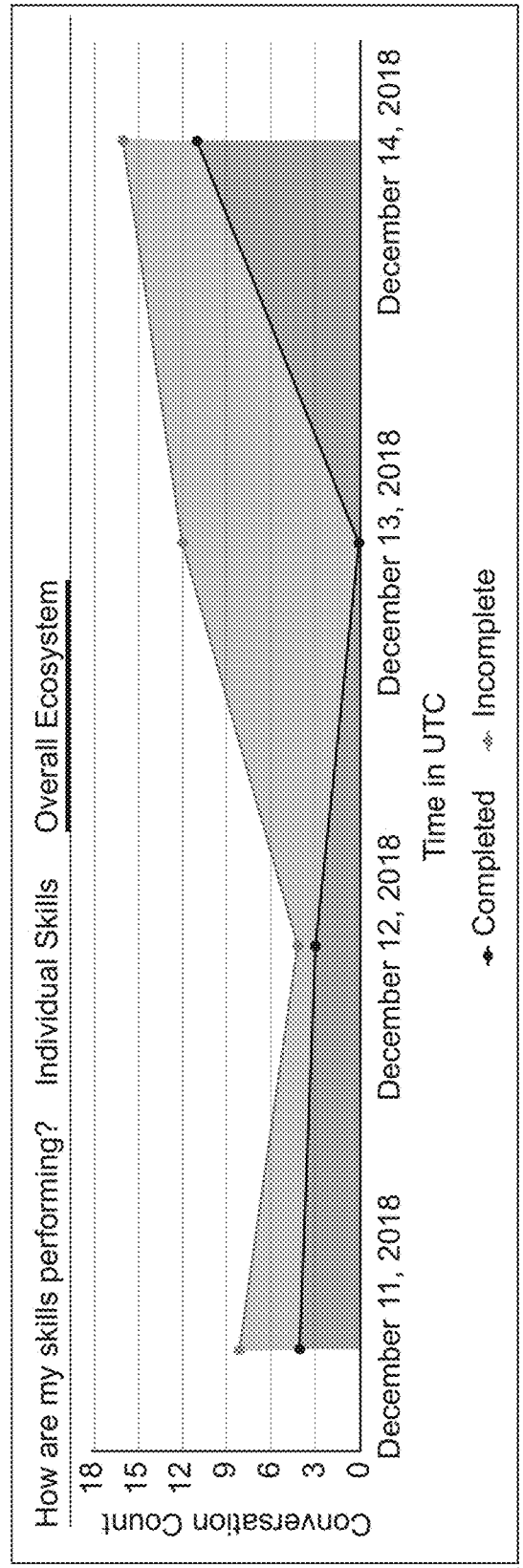

FIG. 5C depicts an interface screen 510 that shows the performance trends for all of the selected skills can be viewed using the Overall Ecosystem report's stacked area chart that's part of the Line of Business Insights. In the interface screen 510, the stacked area chart plots the completed and incomplete data series. The y axis of the chart displays the number of conversations. The x axis plots the days (January 7, January 8, for example). The stacked area chart contrasts the completed conversations for the period against conversations that customers couldn't complete because of unresolved intents (or other problems) and the conversations that remained incomplete because they were abandoned by customers.

Figure 5D:
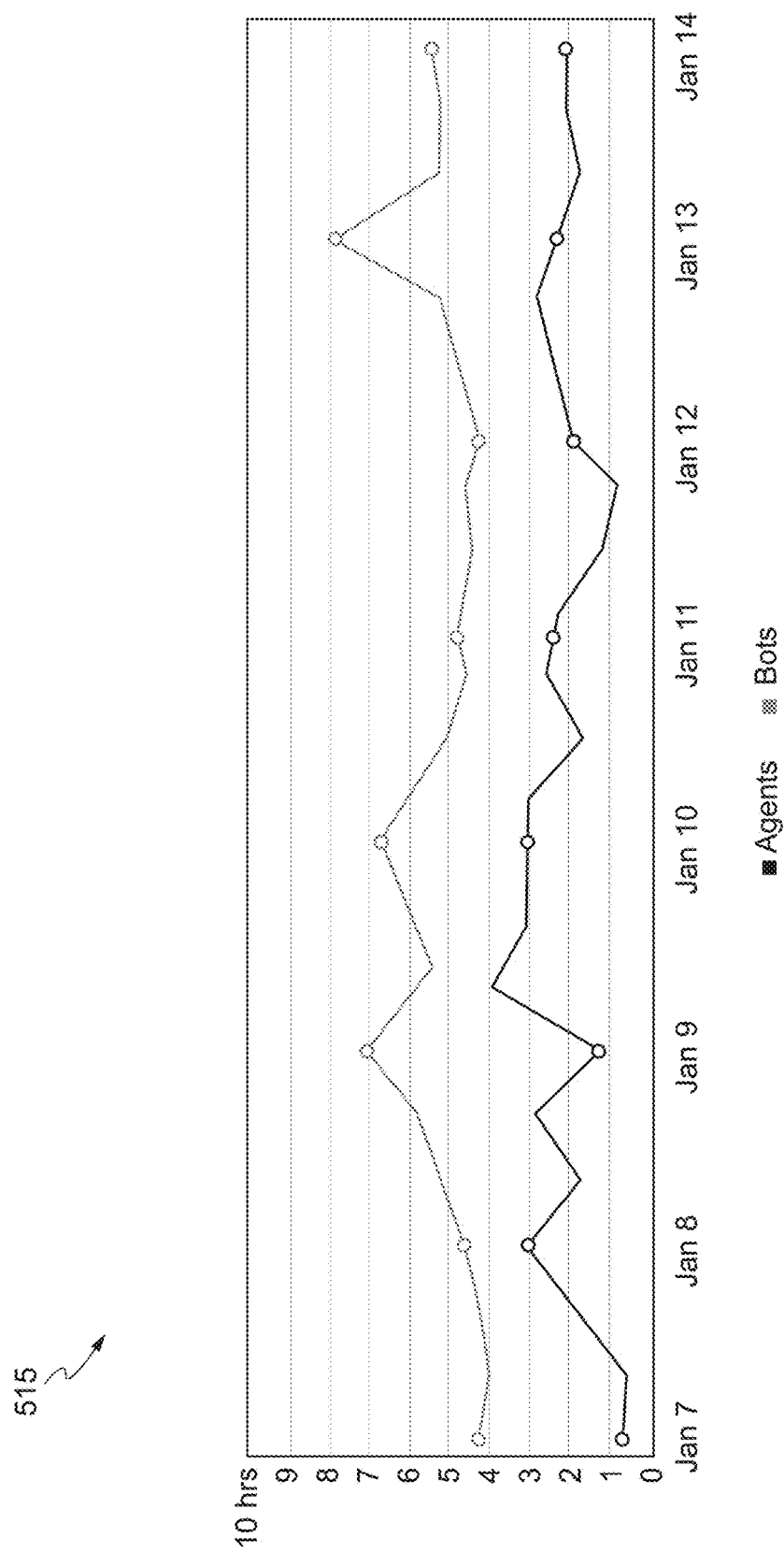

FIG. 5D depicts an interface screen 515 that shows the How Have My Bots Added Value? report that's part of the Line of Business Insights. In the interface screen 515, a line chart plots two series: Agents and Bots. The y axis of this chart is the number of hours. The x axis plots the days (January 7, January 8, for example). For skills integrated with human agents through a service such as Oracle Service Cloud, a user can use this report to contrast the number of hours that these skills spent handling user tasks on their own against the number of hours that human agents had to spend helping out customers. (Ideally, the skills should have been doing most of the work.)

Figure 5E:
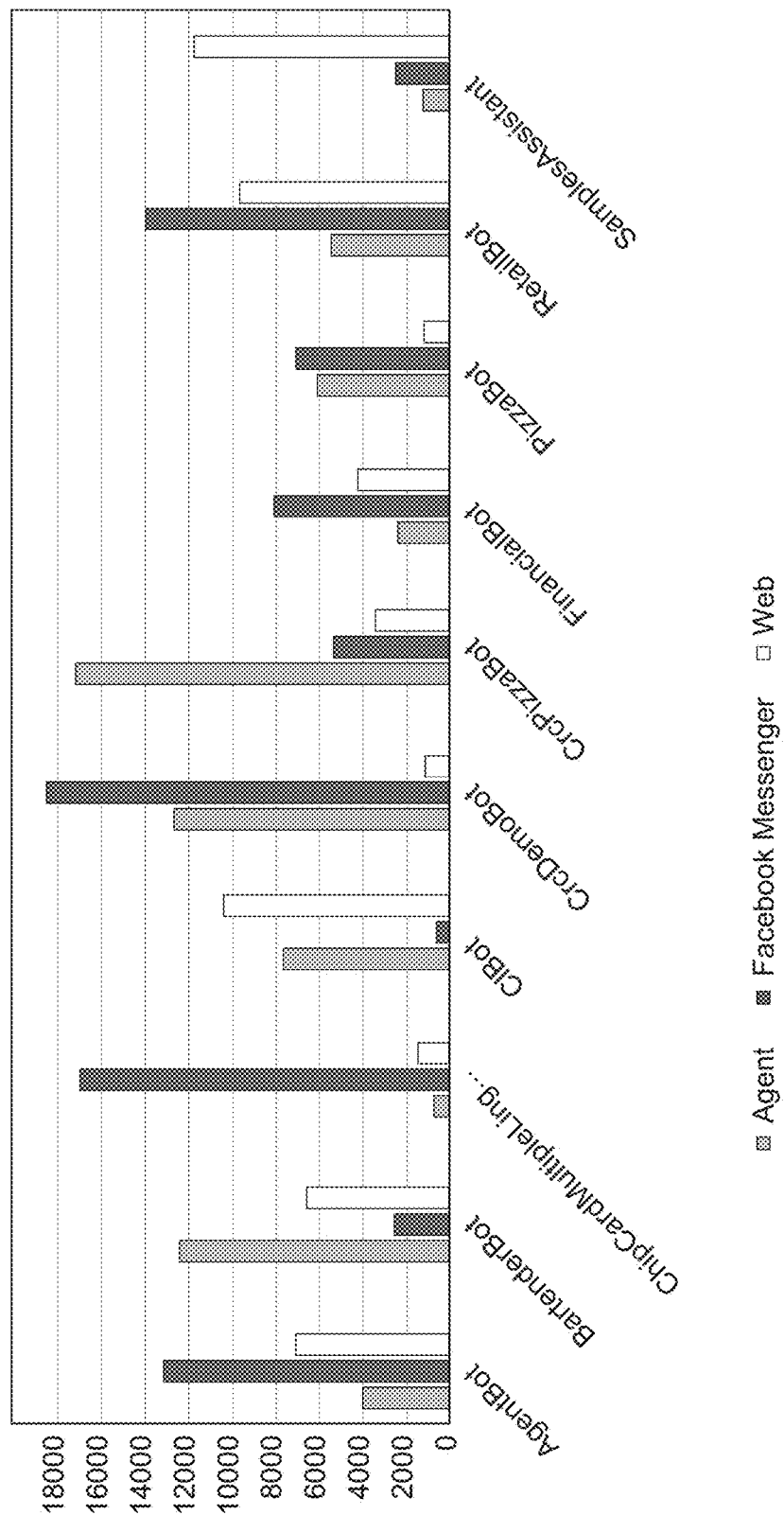

FIG. 5E depicts an interface screen 520 that shows the How Are Users Interacting with Skills? report that's part of the Line of Business Insights. In the interface screen 520, a clustered bar chart is provided where each bar is plotted from data from user channels and the Agent channel. The y axis displays numbers. The x axis names the skills, which correspond to each bar cluster. This popularity report compares the customer traffic on the different channels routed to each skill for the selected period. This chart also includes the channel for the agent integration (when it exists).

Skill Insights

Figure 6A:
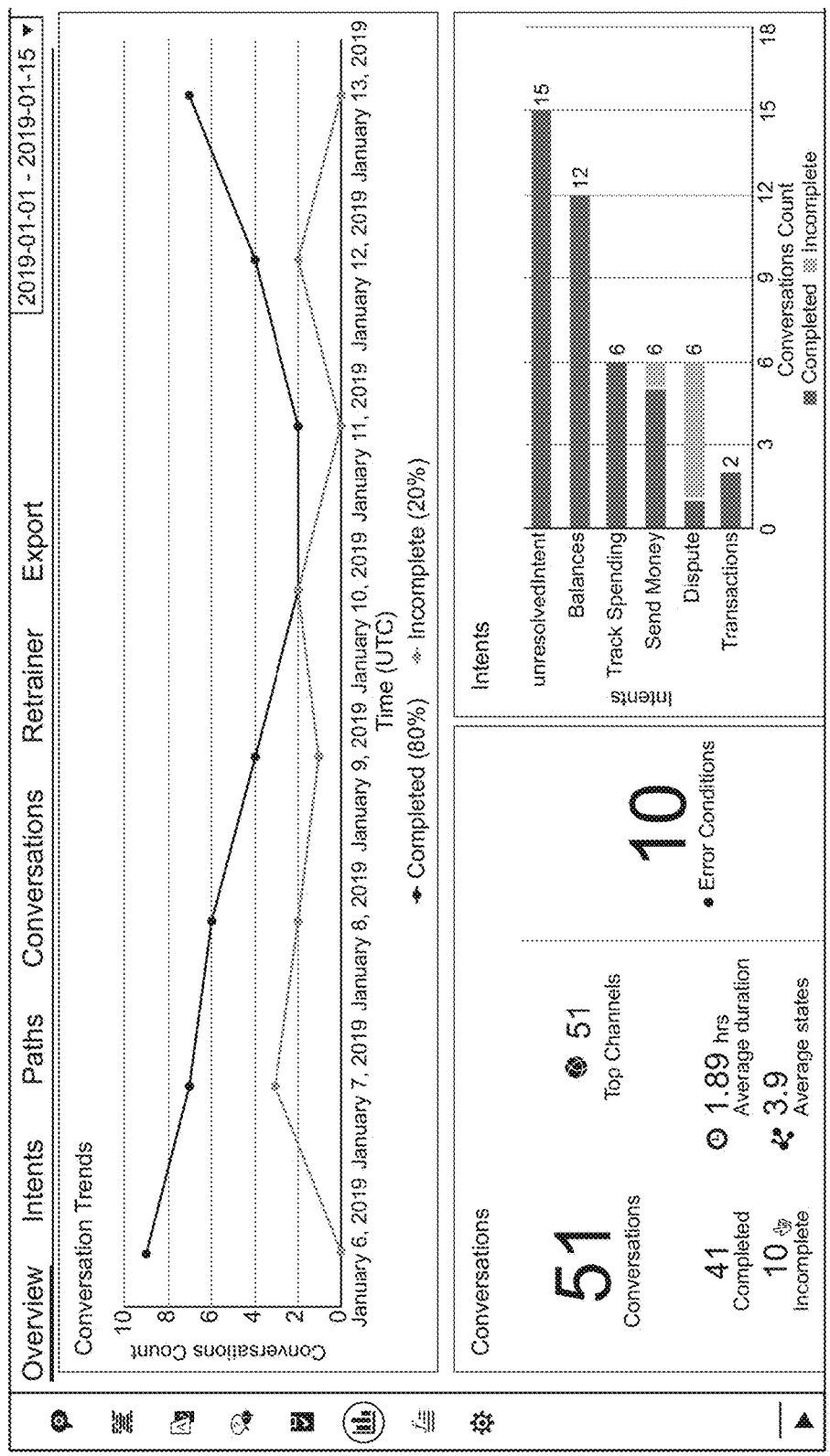
FIGS. 6A-6N depict examples of a graphical user interface screen displaying skill insights for improving a bot system according to various embodiments.

FIG. 6A depicts an example of a graphical user interface screen 600 displaying summarized information of conversations associated with a digital assistant according to certain embodiments. These dashboard insights reports can be used to offer developer-oriented analytics to pinpoint issues with skills so a user can address them before they cause problems. To access the reports, a user may open a digital assistant and then select an insights icon in the navigation bar. The dashboard reports include an overview report, an intents report, a paths report, conversations report, a retrainer, and an optional export interface. The Overview—Shows a user a graph of the total conversation metrics in terms of the conversations that an enterprises skill's users have either abandoned or completed over time. This report also shows the user the top intents with execution metrics, the most-used channels, and conversation duration and error counts. The Overview report is also the user's access point for the intents and conversations reports. Intents—Provides intent-specific data and information for the execution metrics (states, conversation duration, and most- and least-popular paths). Paths—Shows a visual representation of the conversation flow for an intent. Conversations—Displays the actual transcript of the skill-user dialog, viewed in the context of the dialog flow and the chat window. Retrainer—Is where a user can obtained insights to improve their skill through moderated self-learning. Export—Lets a user download Insights data to a CSV file so that the user can use it to create their own report.

Figure 6B:
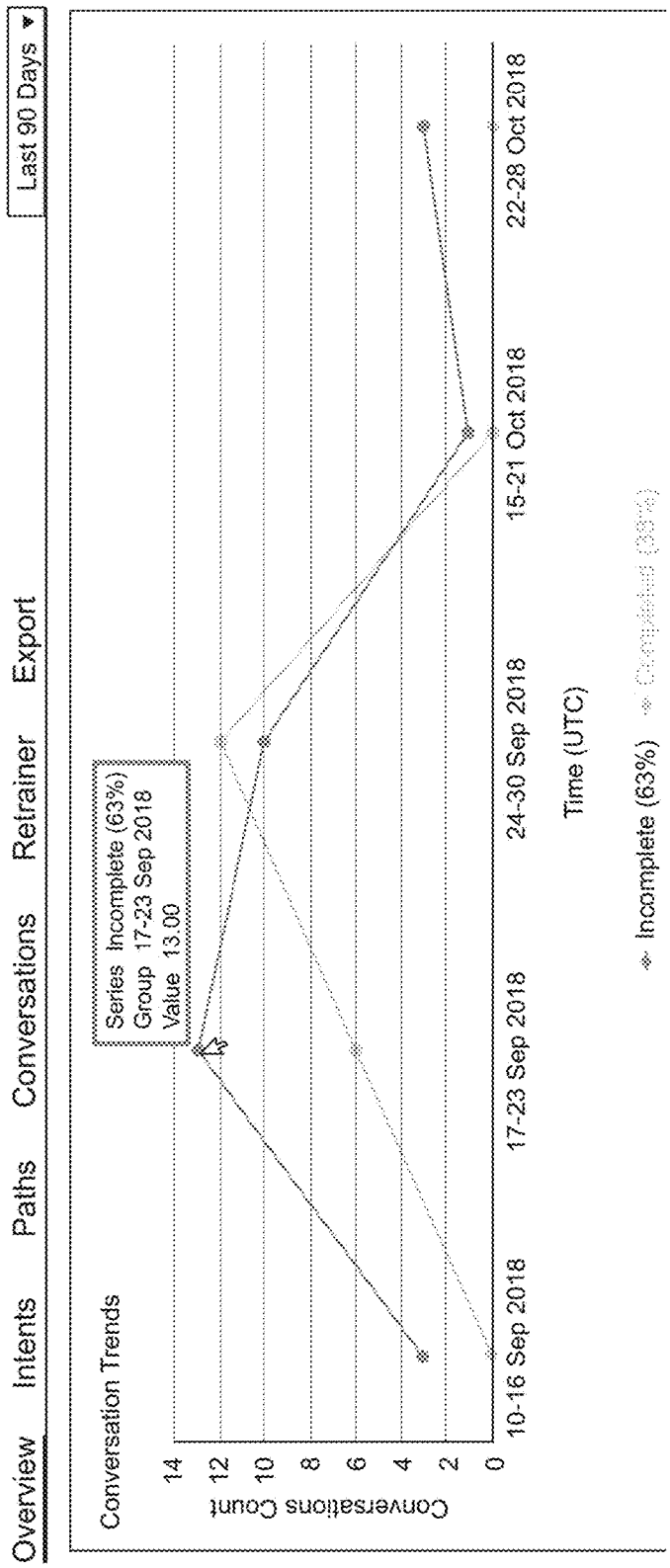

FIG. 6B depicts an interface screen 605 that shows the Overview report that's part of the Skill Insights. The Overview report is a dashboard whose key performance indicators and charts show your skill in terms of the number of conversations it completed, or failed to complete, for a given period. In the interface screen 605, the top left-hand side of the image shows the breadcrumb path for the Insights reports: Overview (selected here) >Intents>Paths>Conversations>Retrainer. Directly to the right is the date picker, which reads Last 30 Days. Directly below the trail is a pane entitled Conversation Trends. Within it is a line chart with two trend lines: Incomplete and Complete. The y axis is Conversations Count and the x axis tracks time in terms on month and year. In this image, the cursor hovers over the Incomplete line to show statistics for a point in time.

Figure 6C:
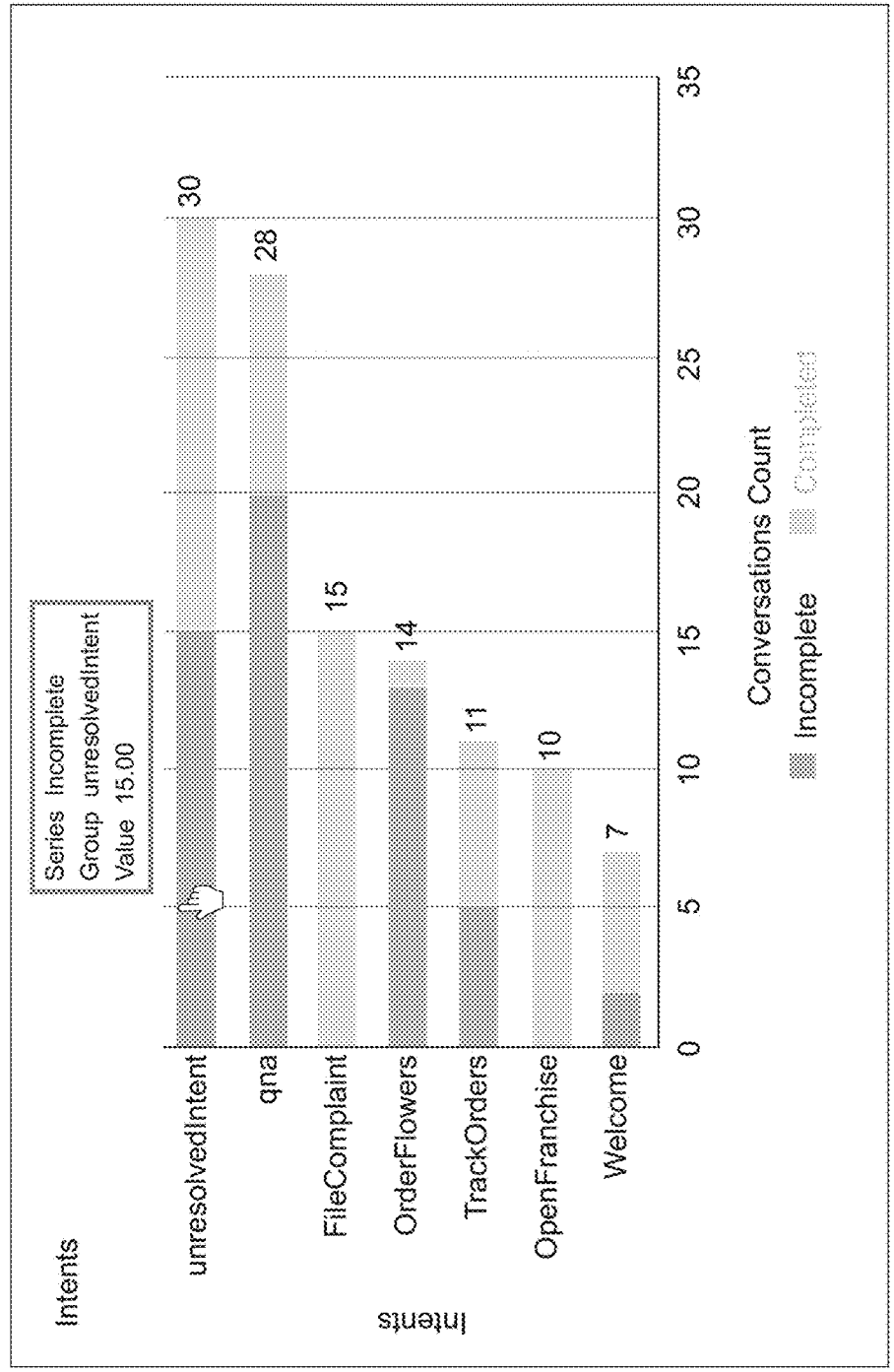

FIG. 6C shows an interface screen 610 of a segment of the Overview Insights report. It is a pane called Intents. Within it is a horizontal, stacked bar chart. It's segments (as identified by the legend directly beneath the bar chart) are Incomplete and Completed. The y axis of this chart are the intents and the x axis is the conversations count. In this image, the cursor hovers over one of the Incomplete segments to reveal Series-Group-Value statistics for a point in time. From this high-level view, a user can spot the intents that cause the incomplete conversations. A user can also see if the frequency of use for these intents bears out the user's use case, or inverts it. Does the number of completed conversations for an intent that serves a secondary purpose outpace the number of completed conversations for the user's primary intent? To put this in terms that are more practical has the user's pizza ordering skill become a file complaint skill?

Figure 6D:
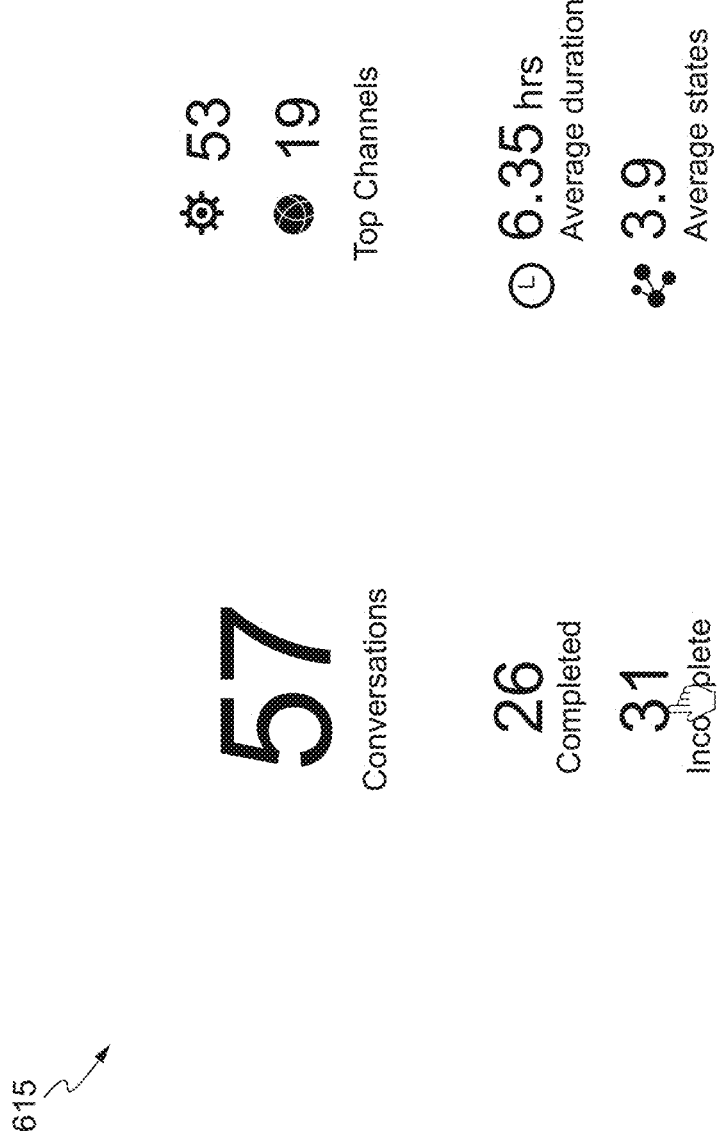

FIG. 6D shows an interface screen 615 of a segment of the Overview Insights report. It is a pane called conversations. Within it display key performance indicators, which are also hyperlinks that give the user access to the other Insights reports. These indicators are: Conversations (total). This is broken down by Completed and Incomplete. In this image, the cursor hovers over the latter; Top Channels; Average Duration; Average States; and Error Conditions.

Figure 6E:
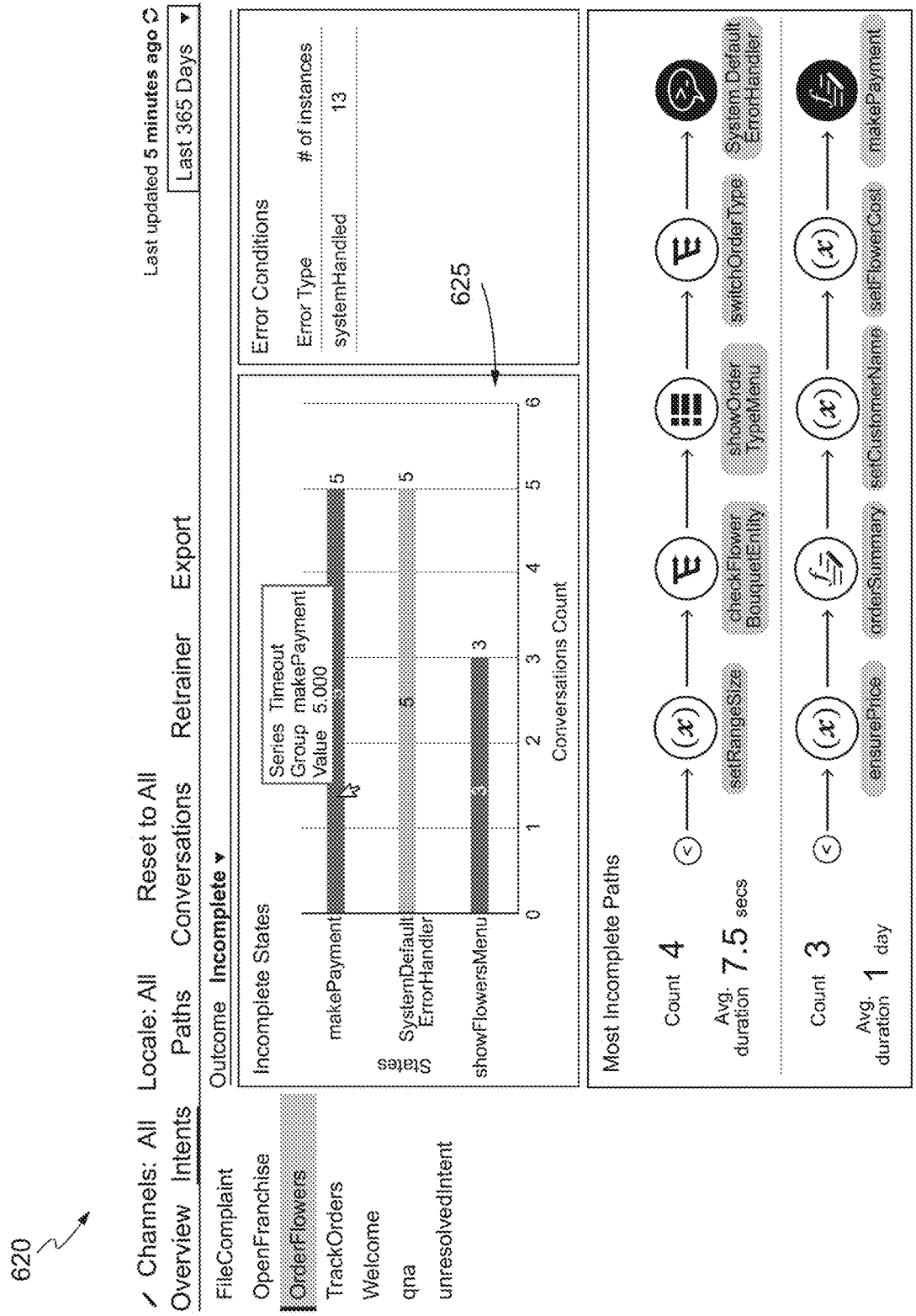

FIG. 6E depicts an interface screen 620 that shows the Intents report that's part of the Skill Insights. The Intents report gives a user a closer look at the user traffic for each intent for a given period. While the user can already see the number of complete or incomplete conversations for each intent on the Overview page, the Intents report shows the user how these conversations flowed through the dialog flow definition by displaying the paths taken and the average length of time it took to get to an ending point. Using the Intents report, the user can isolate the problematic parts of their dialog flow that prevent conversations from completing. The user can also use this report to refine dialog flow. In some embodiments, the Intents report render the dialog flow as a topographical map. It's similar to a transit map, but here each stop is a state. To show the user how the conversation is progressing (and to help the user debug), the map identifies the components for each state along the way. The user can scroll through this path to see where the values slotted from the user input propelled the conversation forward, and where it stalled because of incorrect user input, timeouts resulting from no user input, system errors, or other problems. While the last stop in a completed path is green, for incomplete paths where these problems arise, it's red. Because the report returns the intents defined for a skill over a given time period, its contents change to reflect the intents that have been added, renamed, or removed from the skill at various points in time. For each intent, the user can toggle the view between completed and incomplete conversations for a given period.

For the incomplete conversations, the user can identify the states where these conversations ended using the Incomplete States horizontal bar chart, as shown in FIG. 6E. The chart 625 lets the user spot recurring problems, because it shows the number of conversations where a particular state was the point of failure. Directly beneath the Insight report-wide filters is the navigation path for the Insights reports: Intents (selected here) >Paths>Conversations>Retrainer>Export. At the top right-hand side of the screen is the date picker (which in this screen capture displays "Last 365 Days"). Above it is a status message for the refresh of the Insights data. It reads "Last updated 5 minutes ago." Directly to the left is a "refresh" icon. At the very top-left, is an edit icon. Next to it, are the Insight report-wide filters, Channels and Locale. In this screen capture, they are set to Channels: All and Local: All. To the immediate right of these is the Reset to All option. The intents display on the far left-hand side of the report. To the right of them, parallel with the first intent, is the Outcome drop down menu. In this image, it's Incomplete option has been selected. The report is divided into three separate sections: Incomplete states: A horizontal bar chart. Its y axis shows the states. Its x axis shows the number of conversations. In this screen capture, one of the bars is selected to invoke hover text that explains the why a conversations stopped at this state: time outs. Error Conditions: Shows the errors for a selected state in the bar chart, broken down by error type and # of instances. Most Incomplete Paths: A set of topographical representations of incomplete execution paths. For each of these paths, the report display these two indicators: Count (the number of conversations through the path) and Average Duration (in seconds). The user can also scroll along the paths to see the preceding states. As described in detail herein, using the Paths report, the user can see the reasons why the flow ended at this state (meaning errors, timeouts, or bad user input).

Figure 6F:
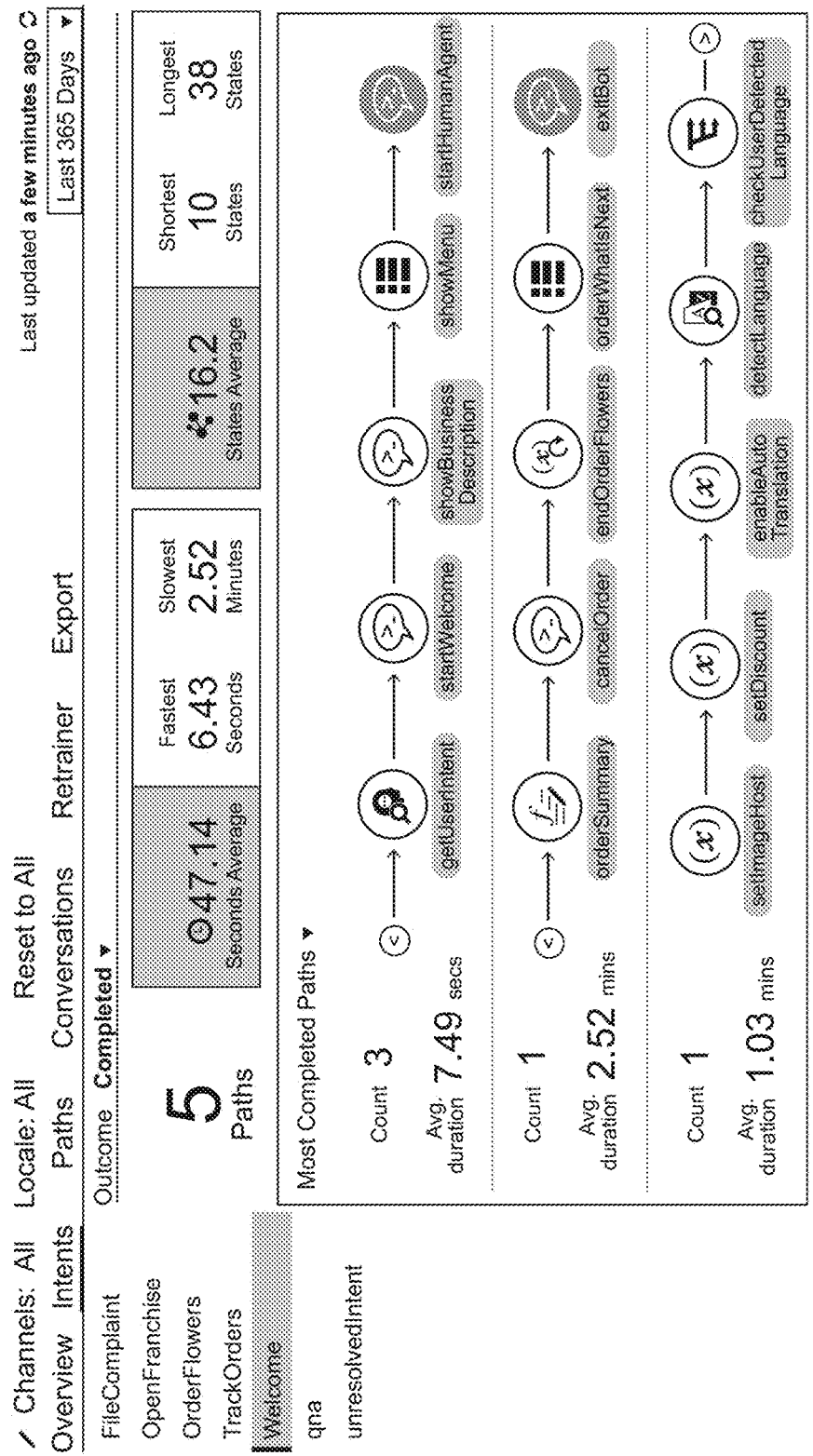

For the complete conversations, a user can use the Completed view's statistics and paths as indicators of the user experience, as shown in FIG. 6F. For example, the user can use report 630 to ascertain if the time spent is appropriate to the task, or if the shortest paths still result in an attenuated user experience, one that encourages users to drop off. Could you, for example, usher a user more quickly through the skill by slotting values with composite bag entities instead of prompts and value setting components? Directly beneath the Insight report-wide filters is the navigation path for this Insights report: Intents (selected here) >Paths>Conversations>Retrainer>Export. At the top left-hand side of the screen is the date picker (which in this screen capture displays "Last 30 Days"). Above it is a status message for the refresh of the Insights data. It reads "Last updated a minute ago." Directly to the left is a "refresh" icon. At the very top-left, is an edit icon. Next to it, are the Insight report-wide filters, Channels and Locale. In this screen capture, they are set to Channels: All and Local: All.

To the immediate right of these is the Reset to All option. The intents display on the far left-hand side of the report. To the right of them, parallel with the first intent, is the Outcome drop down menu. In this image, it's Complete option has been selected. With this option selected, the report outputs a section called Most Completed Paths. It's a set of set of topographical representations of complete execution paths. For each of these paths. Accompanying each path on the left-hand side are these two indicators: Count (the number of conversations through the path) and Average Duration (in seconds). Above the paths are a series of indicators for the group of completed paths returned by the report. They are: Paths; Seconds Average. This number is further broken down by fastest and slowest; and States Average. This number is further broken down by shortest and longest.

Figure 6G:
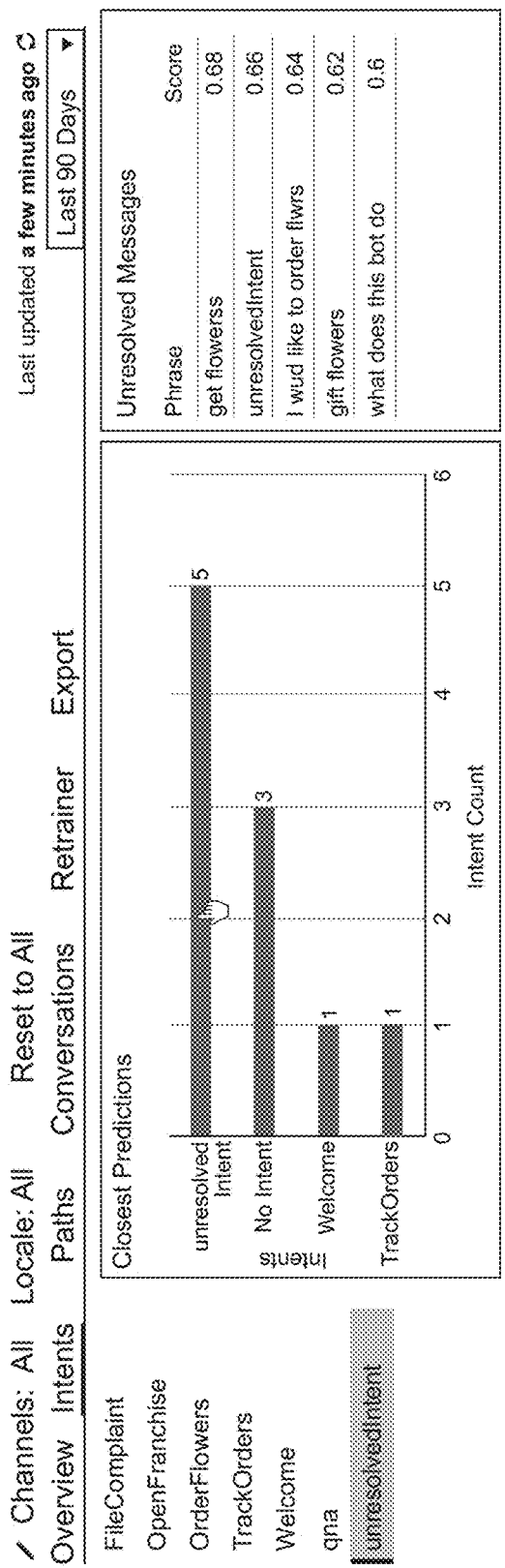

In addition to the duration and routes for task-oriented intents, the Intents report also returns the utterances that couldn't get resolved. To see these utterances, click unresolvedIntent. FIG. 6G shows interface screen 635 of a segment of the Intents Insights Report. At the top-left is the navigation path for the Insights reports: Intents (selected here)>Paths>Conversations>Retrainer>Export. The intents display on the far left-hand side of the report. In this screen capture, unresolvedIntent has been selected. As a result, the screen is populated with two panes: Closest Predictions: A horizontal bar chart. The intents are on the y axis, and the intent count is on the x axis. Top Unresolved Utterances (directly to the right of the Closest Predictions pane): Ranks the utterances using the Phrase and Score columns. This report doesn't show paths or velocity because they don't apply to this user input. Instead, the bar chart ranks each intent by the number utterances that either couldn't be resolved to any intent, or had the potential of getting resolved (meaning the system could guess an intent), but were prevented from doing so because of low confidence scores. By clicking an intent in the bar graph, the user can see these candidate utterances, sorted by a probability score. In some embodiments, these are the same utterances that get returned by the default search criteria in the Retrainer report, so the user can add them there.

Figure 6H:
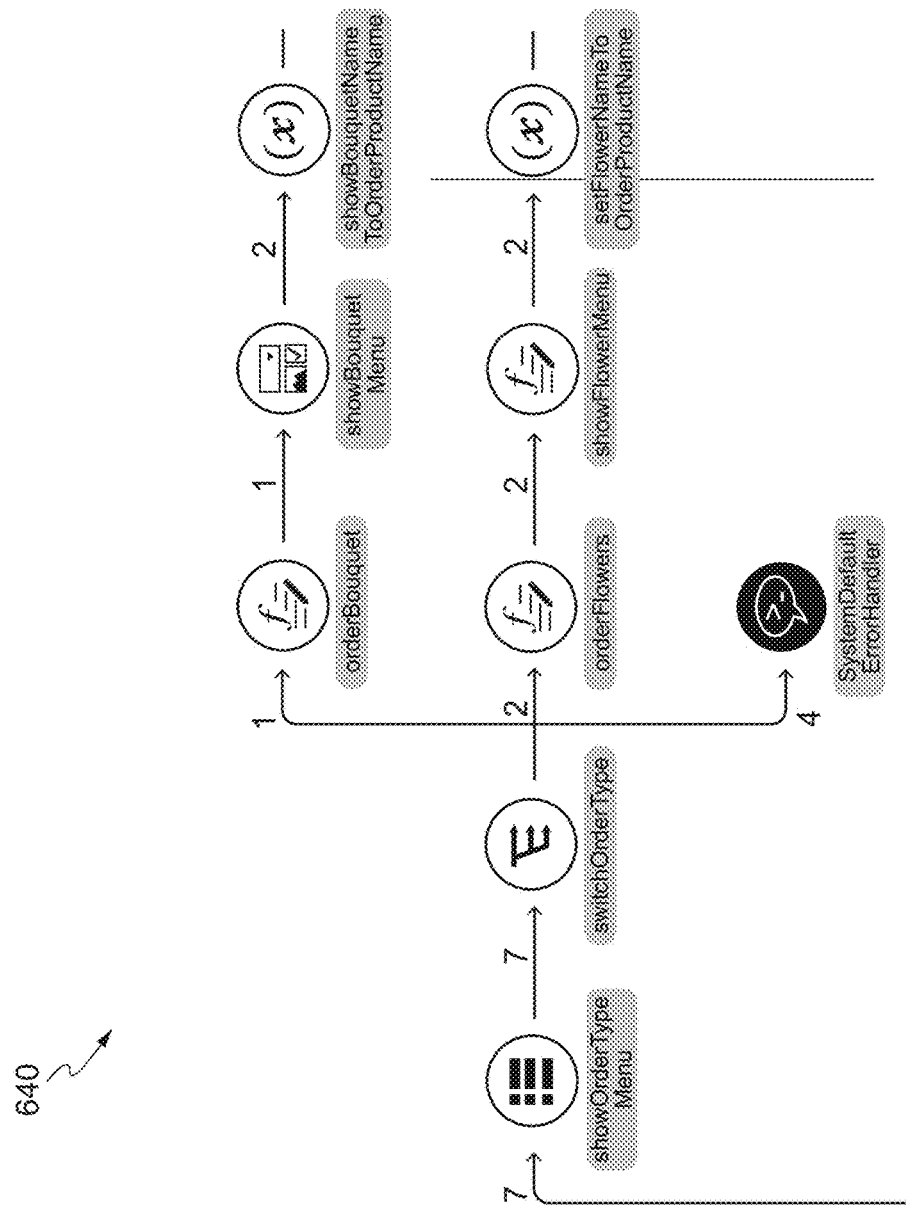

FIG. 6H depicts an interface screen 640 that shows the Paths report that's part of the Skill Insights. The Paths report lets a user find out how many conversations flowed through the intent-specific paths of the dialog flow for a given period. It shows the user the number of conversations maintained between each state and the different execution paths taken because the conversation branched due to values getting set (or not set), or dead-ended because of some other problem like a malfunctioning custom component. FIG. 6H shows specifically a section of the execution path for an intent. It looks like a metro stop, one that starts at the left and ends on the right. In between, the path can branch horizontally. The various states along the way are akin to stops. The states are connected both horizontally and vertically with directional arrows. Each arrow bears a number, which represents the number of conversations that have been carried from one state to another. Where the path branches, the number of conversations that remained steady on the horizontal line, diminishes as the paths split in different directions, carrying the conversations accordingly.

Figure 6I:
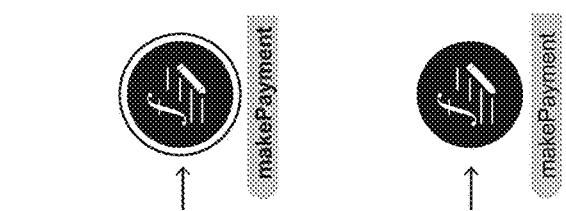

When a query is run on this report for incomplete execution paths for an intent, the user can also choose the final state. By clicking the final state, the user can find out more about the conversation's success or failure from the error utterances or the last customer utterance that displays in the detail panel. FIG. 6I shows a interface screen 645 of the statistics that the Paths Insights report displays when the user click the final state in an execution path. This state-specific information displays in a panel. The panel is named after the highlighted state and has the following sections: Abandonments—There are two subsections: Timeouts and Errors; Phrases; and Conversations—This is a hyperlink that opens the Conversations Insights report. The report displays Null Response for any customer utterance that is blank (or not otherwise in plain text) or contains unexpected input. For non-text responses that are postback actions, it displays the payload of the most recent action. For example: {"orderAction": "confirm" "system.state":"orderSummary"}.

Figure 6J:
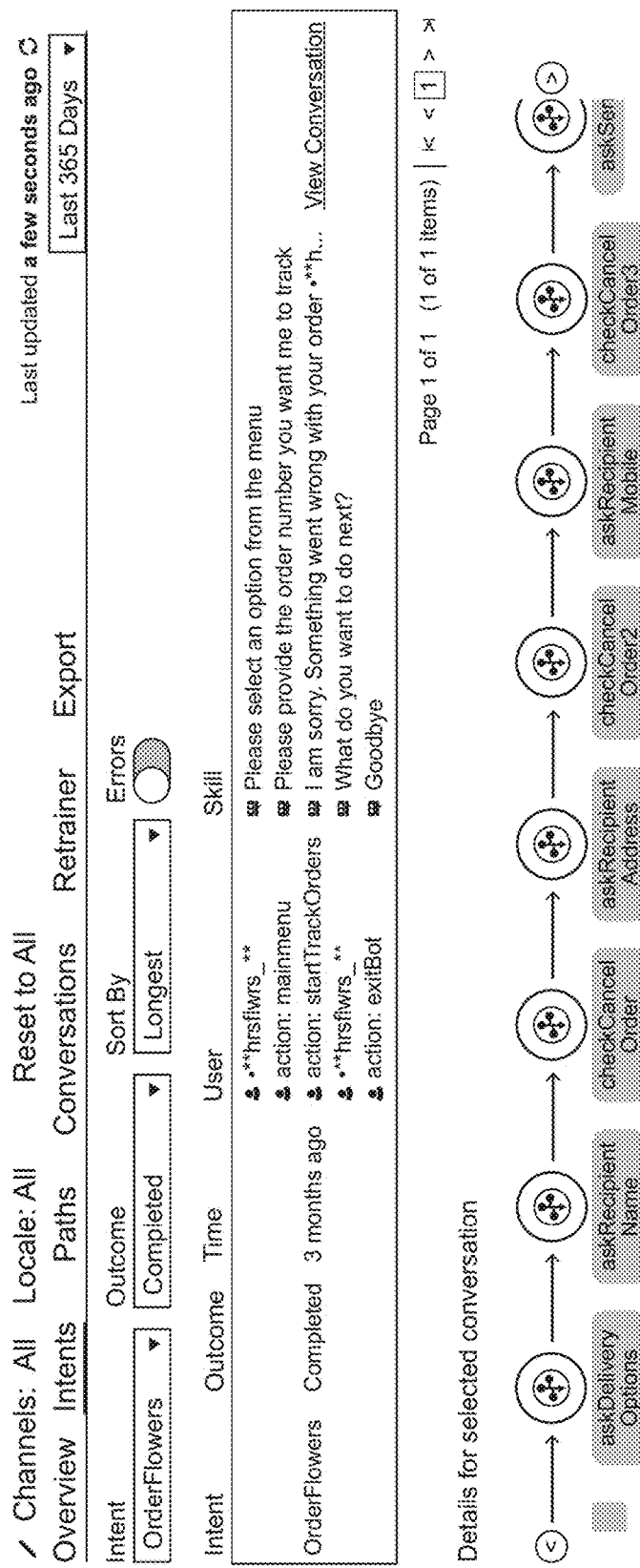

FIG. 6J depicts an interface screen 650 that shows the Conversations report that's part of the Skill Insights. For example, clicking Conversations shown in FIG. 6I opens the Conversations report, where a user can review the entire transcript. Using the Conversations report, a user can examine the actual transcripts of the conversations so that the user can see how users completed the intent-related paths, and why they didn't. To see these transcripts, this report lets the user filter by the intents that enable them. The user can add dimensions like conversation length and outcome, which is noted as either completed or incomplete. The user can also toggle the view to include any system or custom component errors that might have interfered with the conversation. Each row returned by the report shows the transcript of the conversation and the path that carried it. The user can see this dialog within the context of a chat window by clicking View Conversations.

As shown in FIG. 6J, at the very top-left, is an edit icon. Next to it, are the Insight report-wide filters, Channels and Locale. In this screen capture, they are set to Channels: All and Local: All. To the immediate right of these is the Reset to All option. At the top left-hand side of the screen is the date picker (which in this screen capture displays "Last 30 Days"). Above it is a status message for the refresh of the Insights data. It reads "Last updated a few seconds ago." Directly to the left is a "refresh" icon. Directly beneath the Insight report-wide filters is the navigation path for the Insights reports: Intents>Paths>Conversations (selected here)>Retrainer. Directly beneath the navigation path are the filtering options for this report. From left to right, they are: Intent, Outcome, Sort By, and Errors. Intent, Outcome, and Sort By are drop down menus, but Errors is a toggle switch (positioned in "off" for this image). Beneath the filtering options is a table that displays the results. It has the following columns: Intent; Outcome; Time; User; and Bot. The User and Bot columns display a transcript of the utterances from both the customer and the skill, respectively. Directly to the left of the transcript is the option called View Conversation. At the bottom-right of the table is the pagination controls. Below the table is a section called "Details for selected conversation," which shows a topographical representation of the transcript. It's a linear transit map that runs from left (the beginning) to right (the end of the conversation), with each state that was traversed during the course of the conversation depicted as the equivalent of a station, or stop.

Figure 6K:
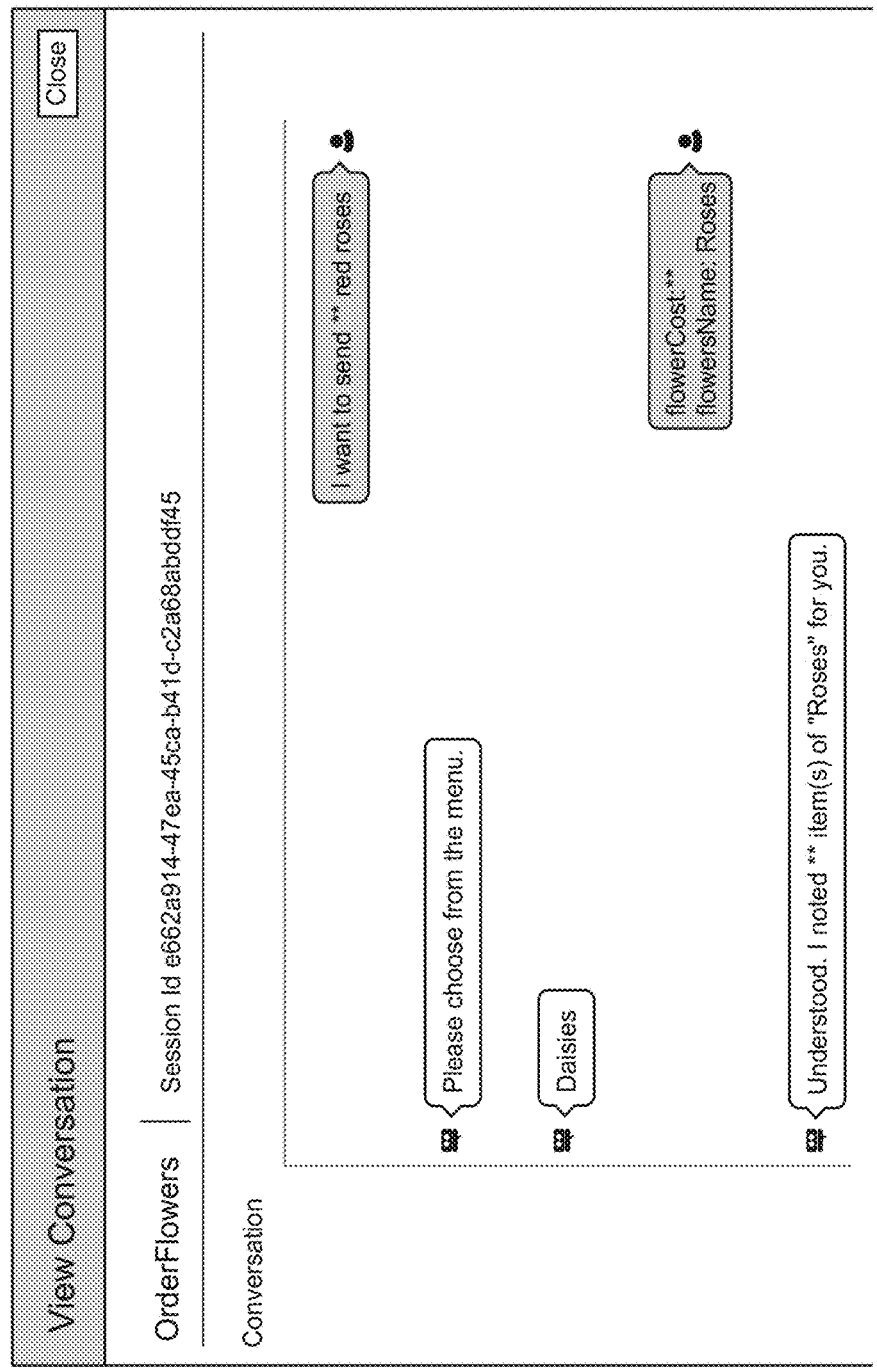

FIG. 6K shows that in some embodiments various data may be obfuscated () within both the chat window and the transcript to protect confidential information like credit card numbers. Specifically, interface screen 655 shows the user-skill bot conversation within a panel called Conversation. Immediately above this panel on the left-hand side is the name of the intent and the Session ID. The bot-user chat is in the Conversation panel itself, with the user's utterances on the right and the skill bot's replies on the left. In this screen capture, all of the numbers in the chat are obfuscated with asterisks. For example, "I want to send  red roses."

FIG. 6L depicts an interface screen 660 that shows the retrainer that's part of the Skill Insights. The Retrainer lets a user incorporate user input into their training corpus to improve a skill or chatbot. Customers can use different phrases to ask for the same task. This report identifies these phrases and suggests an intent that the user can assign them to. Like the other reports, the user can filter the conversation history for user utterances delivered through a specific channel or locale, but here the user can search for user utterances by intent, by intent resolution-related properties (Top Confidence, Win Margin), or through combinations of these linked together with less than, equal to, or greater than comparison operators. Each user utterance returned by the report is accompanied by a 100% stacked bar chart, a representation of the confidence level resolution for each intent from highest to lowest. The user can reference the chart's segments to match the user input to an intent.

As shown in FIG. 6L, at the very top-left, is an edit icon. Next to it, are the Insight report-wide filters, Channels and Locale. In this screen capture, they are set to Channels: All and Local: All. To the immediate right of these is the Reset to All option. Directly beneath the Insight report-wide filters is the navigation path for the Insights reports: Intents>Paths>Conversations>Retrainer (selected in this screen capture). Directly beneath the navigation path are the filter options for the Retrainer. The Retrainer lets you sort using ALL or ANY on different options (located at the top left-hand side of the screen) and the date picker (located that the upper right-hand side of the screen). Right above this date picker (which in this screen capture displays "Last 30 Days"), is a status message for the refresh of the Insights data. It reads "Last updated a few seconds ago." Directly to the left is a "refresh" icon. In this screen capture, the options are Top Intent Name, Matches, and unresolvedIntent. This is the only criteria for this particular report, but if the user wanted more, the user can click the +Critera button (located at the right-hand side of the screen) to add another set of filter options. At the left-hand side, located below the filtering options, is the Search button.

The Retrainer sorts the utterances into the following columns: Utterances: The actual user message or utterance. To the immediate left of the utterance is a select option. Resolved Intent: the intent (if any) to which the utterance, or user utterance, has been resolved, or matched. Intent Classification: A 100% bar chart that's segmented by the Retrainer's best guesses for matching intents. Each different segment has a different color and a corresponding "legend" immediately to the right. Immediately to the right is either the name of the matched intent, or if there's no intent that can be matched, the Retrainer displays Select Intent. To the immediate right, there's an option to open a menu to select either an intent (where there has been no matches), or a new intent (where there has been a match). The Select Intent option also displays above the table of results, so you can use it as a filter. Below the table is the Add Example button. At the bottom left of the screen is the pagination for the results. In this image, it's Page 1 of 2. In some embodiments, when a user adds user utterances to their training corpus the following mat need to be taken into consideration: When a user adds the user utterance as an intent, you'll need to retrain your skill, a user can't add any user input that's already present as an utterance in the training corpus, a user can add utterances to individual intents, or you can select all of the user utterances by clicking Utterances, then Add Examples.

Figure 6M:
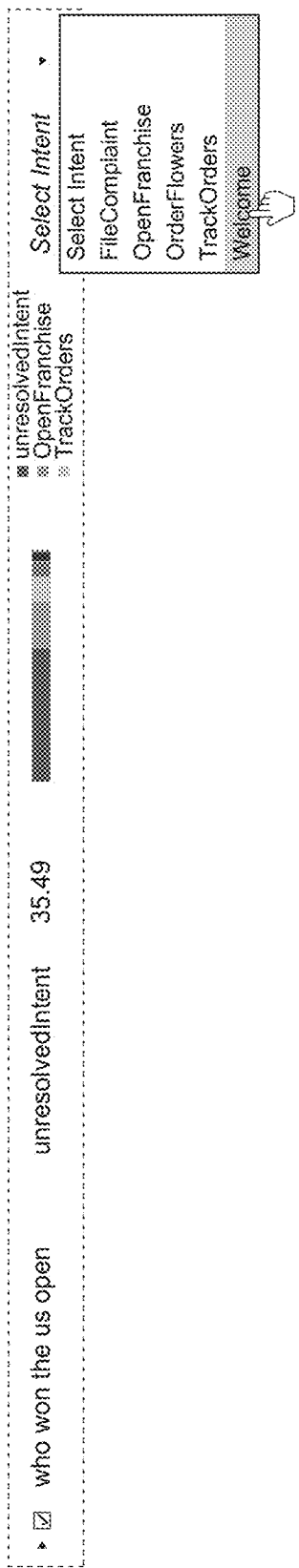

By setting the Top Confidence filter below the Confidence Threshold set for the skill, or through the default filter, Intent Matches unresolvedIntent, the user can update their training corpus using the confidence ranking made by the intent processing framework. This is moderated self-learning—enhancing the intent resolution while preserving the integrity of the skill. For instance, the default search criteria for the report shows the user the random user input that can't get resolved to the Confidence Level because it's inappropriate, off-topic, or contains misspellings. By referring to the bar chart's segments and legend, the user can assign the user input: you can strengthen the skill's intent for handling unresolved intents by assigning the input that's made up of gibberish, or the user can add misspelled entries to the appropriate task-oriented intent ("send moneey" to a Send Money intent, for example). For example, as shown in interface screen 665 of FIG. 6M, if the user's skill has a Welcome intent, for example, the user can assign irreverent, off-topic utterances to which the user's skill can return a rejoinder like, "I don't know about that, but I can help you order some flowers."

FIG. 6N depicts an interface screen 670 that shows the exporter that's part of the Skill Insights. The various Insights reports provide a user with different perspectives on Insights data, but if the user needs to view this data in another way, then the user can create their own report from a CSV file of exported Insights data. For example, a user can define the kind of data that they want to analyze by creating an export task. An export task applies to current version of the skill. Once this task has completed, the user can then download the CSV file. It contains details like user utterances, skill responses, component types, and state names in a readable format. The Exports page lists the tasks by: Name: The name of the export task. Last Run: The date when the task was most recently run. Created By: The name of the user who created the task. Export Status: Started, In Progress, Failed, No Data (when there's no data to export within the date range defined for the task), or Completed, a hyperlink that lets you download the exported data as a CSV file. Hovering over the Failed status displays an explanatory message.

As shown in FIG. 6N, on the right-hand side of the screen is the date picker drop down menu. Directly below the breadcrumb trail is the Add Export button. Underneath this button are the search and filtering fields: Filter by Name or Created By, Filter by Status (a drop down menu), and Sort by (a drop down menu). Underneath the search field is a table that sorts the exports by the following columns, which from left to right, are Name, Last Run, Created By, and Status. If a user does not want to export data through the UI, but instead prefer their own code or scripting to export, store, or schedule an export task, then the user can refer to a REST API for the endpoints, syntax, and methods related to export tasks, export task history, and the export of the Insights data itself. The user may need an external authentication and authorization flow to access this API programmatically.

Example of Interpreting Insight Data

Figure 7B:
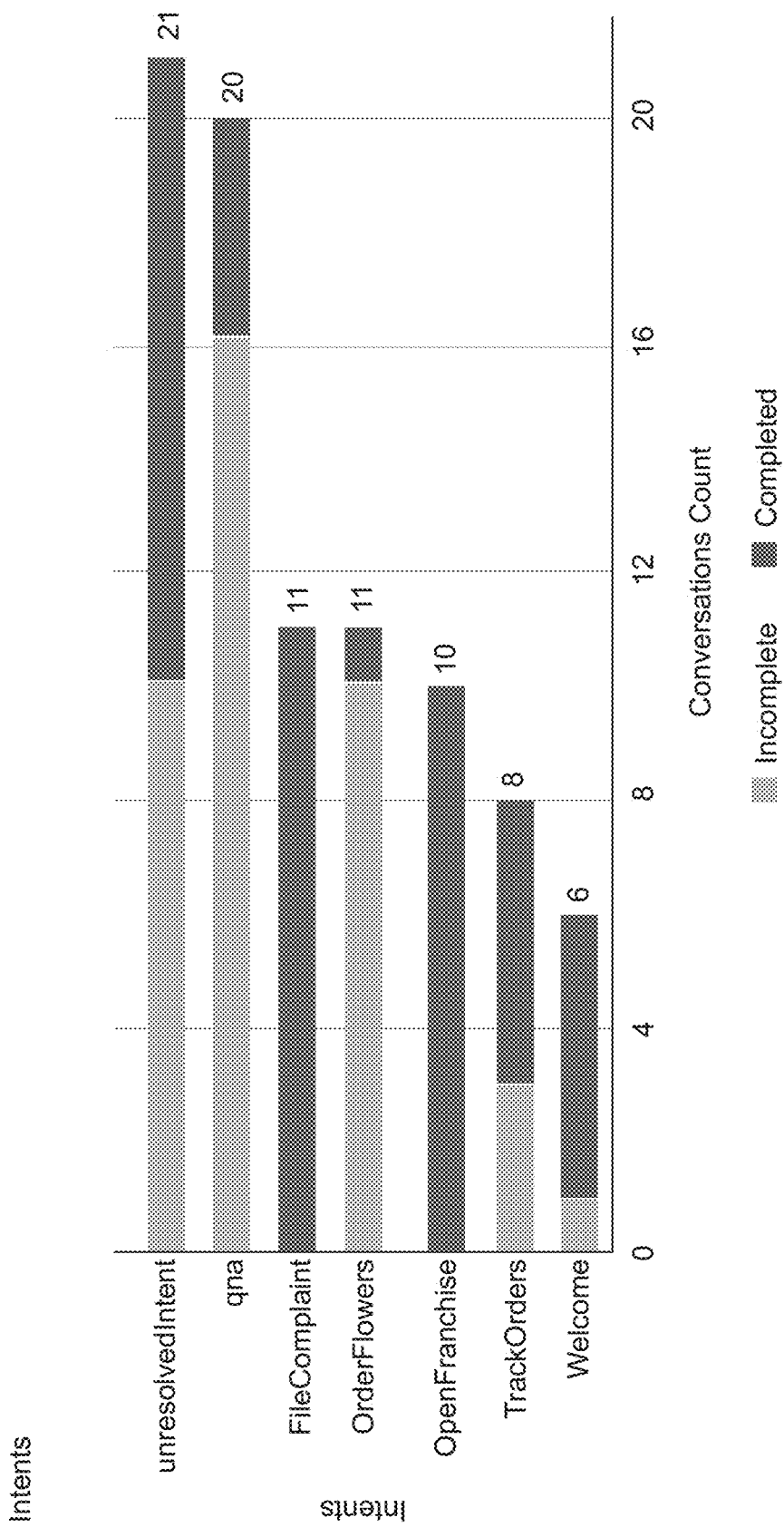

In this example, assume a user has developed a skill called FlowerShopBot whose primary use case is ordering flowers for delivery, but after viewing the activity for the last 90 days, the user can see right away from the Overview report that something's gone wrong. Here are some things that should jump out at the user: The KPIs reveal that the majority of conversations (about 57%) are incomplete (see, e.g., FIG. 7A). The Intents bar graph shows the opposite of what a user may want to see: the execution paths for the OrderFlowers and Welcome intents are underutilized. They should be the top-ranking intents whose execution paths are heavily traversed, but instead they're ranked below File-Complaint, the inverse of OrderFlowers (see, e.g., FIG. 7B). Nearly all of the conversations for the primary use case, OrderFlowers, remained incomplete for the selected time period. The conversations for FileComplaint, on the other hand, have a 100% completion rate, as does OpenFranchise, an ancillary function. The graph's unresolvedIntent bar shows that the skill's training might have some gaps because it's failing to recognize the utterances from half of the conversations during the period. To get this skill back on track, the user may need to use the Intents and Paths reports to pinpoint the state (or states) where users have stumbled off the OrderFlowers execution path. Using the Insights predictions and the Retrainer, the user can also leverage the unresolved utterances for their training corpus.

Figure 7C:
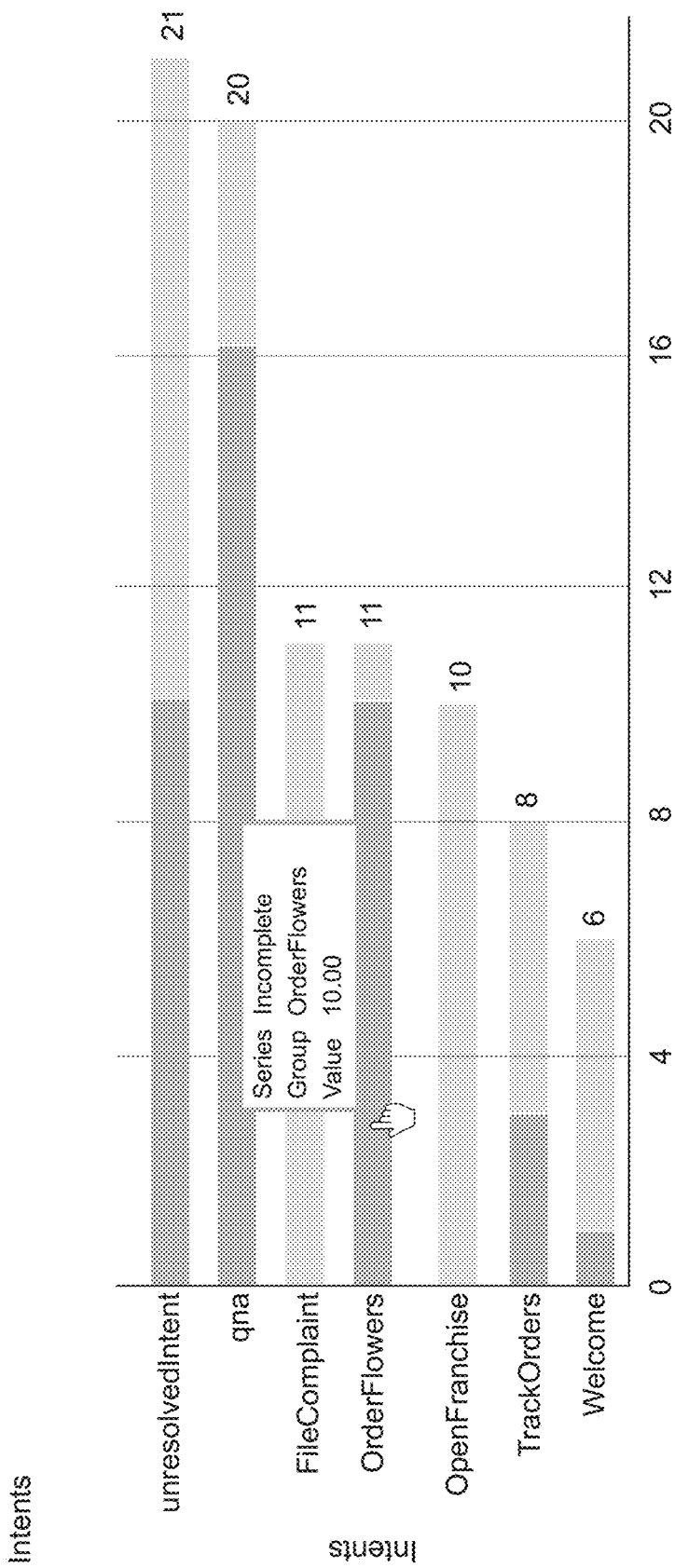
Figure 7D:
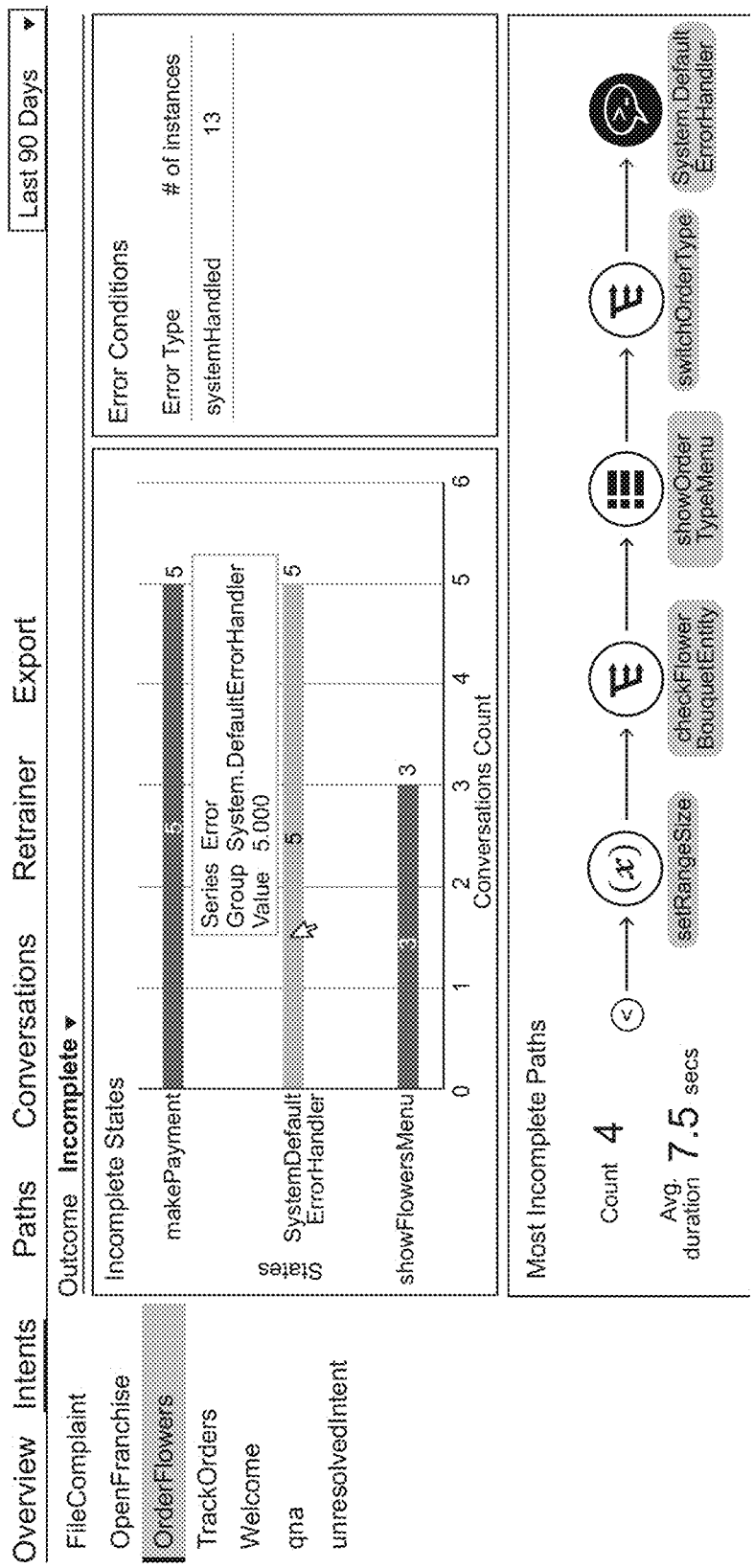

Step 1, Review the OrderFlowers Execution Path in the Intents Report. First, the user can click the incomplete series of the OrderFlowers bar to open the Intents report (see, e.g., FIG. 7C). Drilling down from the Incomplete series opens the Intents reports in its Incomplete outcome mode for OrderFlowers. The report's horizontal bar chart shows the user how many conversations stopped because of a system error (the System.DefaultErrorHandler bar), but it also shows the user two states where conversations ended prematurely: makePayment and showFlowersMenu. (see, e.g., FIG. 7D). Scrolling along the paths gives the user context for these states: the user can see the states that immediately precede these problem areas and the icons show the user which components were defined for each state in the flow. Of particular interest in this regard are the makePayment and showFlowersMenu states, which have been defined with the System.Interactive component and the System.CommonResponse component, respectively.

Figure 7E:
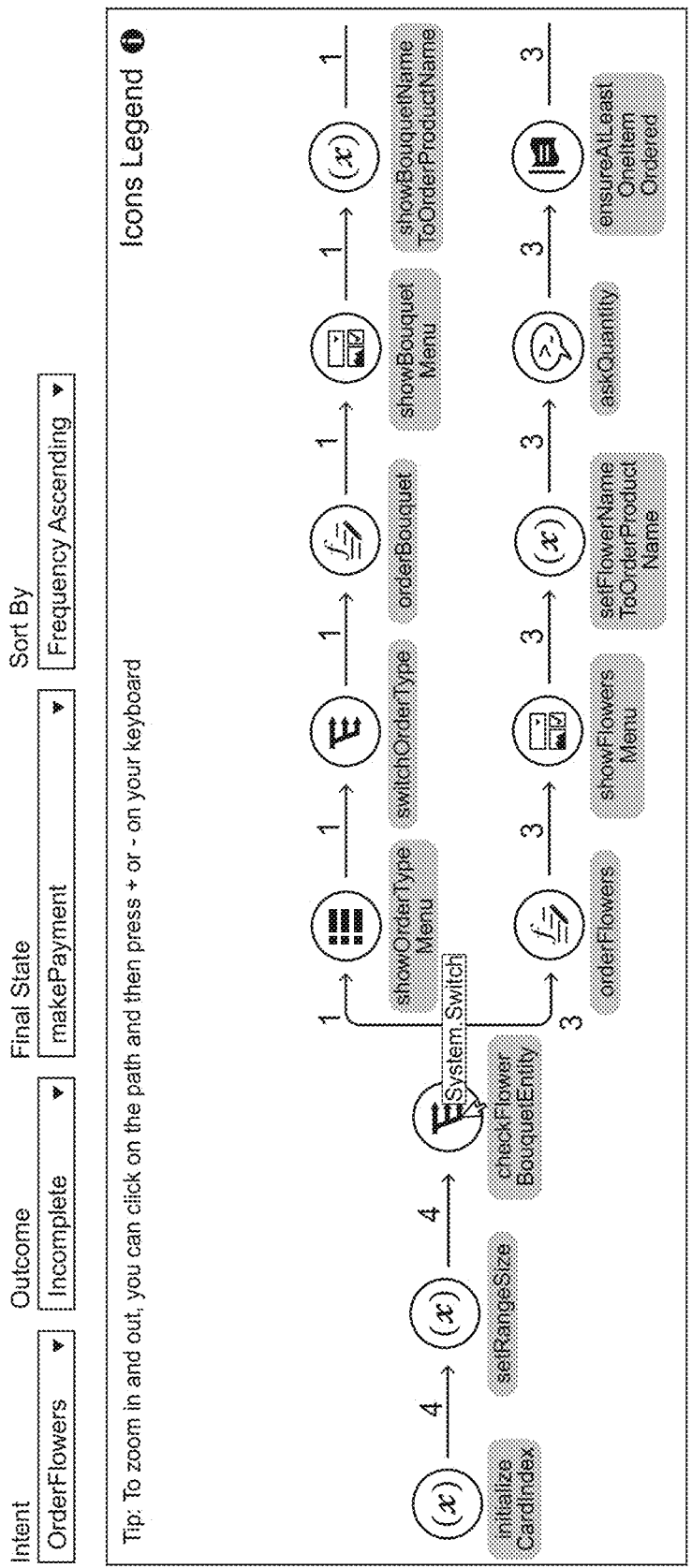

Step 2, Review the Paths Report to see Errors and User Utterances. The Intents report for OrderFlowers shows the user where the conversations ended, but to find out why, the user can open the Paths report and filter by the OrderFlowers intent, Incomplete outcome, and makePayment as the final state. (see, e.g., FIG. 7E) This report gives the user the added dimension of seeing where the conversations branch off after a common starting point. Here, the conversations branch because of the checkFlowerBouquetEntity state. Its System.Switch component and Apache FreeMarker expression route customers to either the orderFlowers or orderBouquet states when the user utterance explicitly mentions a flower type or a bouquet name, or to ShowOrderTypeMenu (a System.List component), when these details are missing.

Figure 7F:
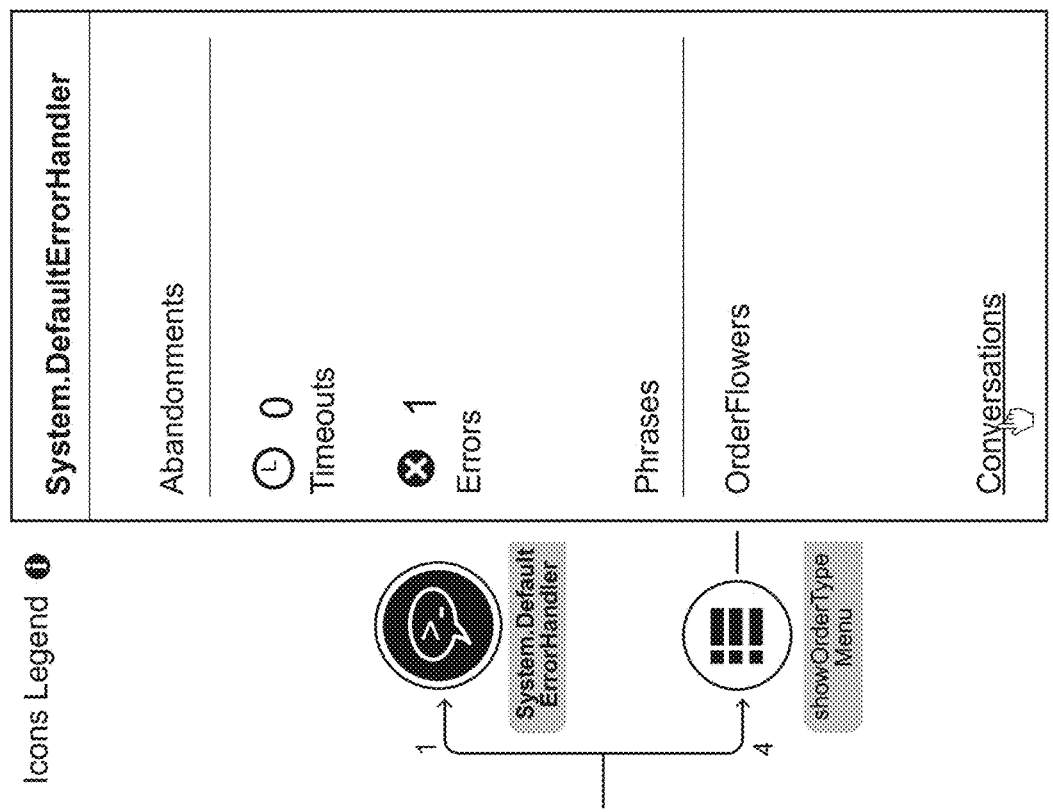

There are system errors on both execution paths. The user can see the utterances received by the skill prior to it throwing these errors by clicking the red System.Output stop in the path. (see, e.g., FIG. 7F).

To see the transcript of the conversation, one that likely culminated in the standard "Oops" message that displays when the skill terminates a session, the user can click Conversations to open the Conversations report. (see, e.g., FIG. 7G). If the report indicates a significant occurrence of system errors on each execution path, then the user might want to augment the dialog flow definition with error transition-related routing that allows customers to continue with the skill. Troubleshoot Timeouts—the user can also see the common point of failure for both these paths, the makePayment state that invokes an instant app. (Or in this case, possibly didn't invoke an instant app). While system errors were blocking users elsewhere, here the Null Response indicates that users appear to be abandoning the skill when the instant app gets invoked. Clicking Conversations opens the transcript, which shows that users stopped short of the instant app, or never bothered to complete it. Because customers consistently abandon the skill when the instant app is invoked, you investigate if the problem lies with the instant app, the dialog flow definition, or a combination of both. Checking the dialog flow against the instant app, you verify the following: The id matches the name of the instant app. The values in the sourceVariableList property variables are getting set and are getting populated in the instant app. The instant app payload is getting stored in the variable.

If the skill-instant app interaction functions properly, then customers might be losing interest at this point. Revisiting the Intents report for a completed OrderFlowers execution path during this period shows you that customers spent about three minutes to traverse 50 states. If this seems overlong, then you can revise the skill so that it collects user input more efficiently. There's also the failed showFlowersMenu state to look into. To see where customers left off, you open the Paths report and then filter by OrderFlowers, Incomplete, and showFlowersMenu as the Final State. Clicking showFlowersMenu shows you that customers have stopped using the skill at this state, which is defined using a System.CommonResponse component. The skill times out because it isn't answering the customer's needs, which in this case, is a bouquet of red roses. By clicking Conversations to drill down to the transcript, you see that it instead automatically chooses daises even after customers decline to make a selection.

```
checkFlowerBouquetEntity:
   component: "System.Switch"
   properties:
     source: "<#if iResult.value?has_content><#if
iResult.value.entityMatches.Bouquets?has_content>orderBouquet<#else><#if
iResult.value.entityMatches.Flowers?has_content>orderFlowers<#else>
none</#if></#if><#else>none</#if>"
   values:
   - "orderFlowers"
   - "orderBouquet"
   transitions:
    actions:
      orderFlowers: "orderFlowers"
      orderBouquet: "orderBouquet"
      NONE: "showOrderTypeMenu"
```

Figure 7H:
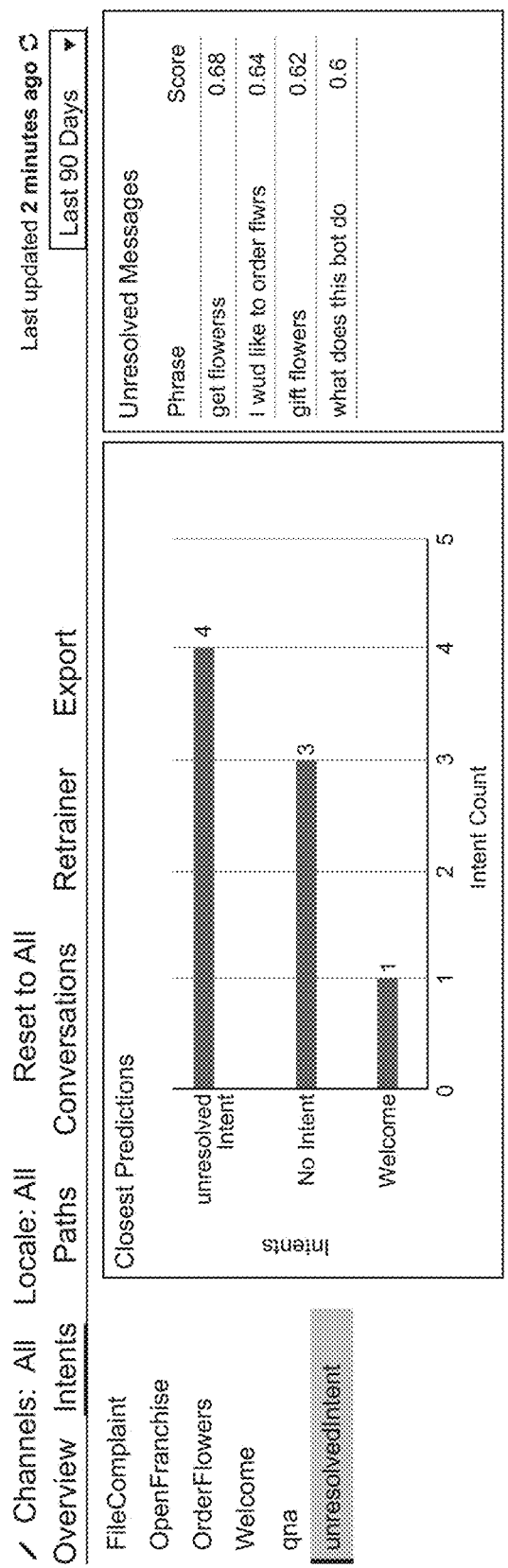

Step 3, Update the Training Corpus with the Retrainer. Besides the problems with the OrderFlowers execution paths, the user should notice that the Overview revealed that the skill can't process 50% of the customer input. Instead of resolving to one of the task-oriented intents, the bulk of the user utterances for the periods are classified as unresolved-Intents. This might be appropriate in some case, but others might provide the user with utterances that the user can add to the training corpus. The user can survey these utterances by doing the following: Click Intents; Click unresolvedIntent; Click the unresolvedIntent bar in the Closest Predictions graph; and Review the Unresolved Utterances panel. There are a couple of utterances that catch the attention of the user because they can help the user's skill fulfill its primary goal even if the customer input contains typos, slang, or unconventional shorthand: "get flowerss" (68%) and "i wud like to order flwrs." (64%). (see, e.g., FIG. 7H).

Figure 7I:
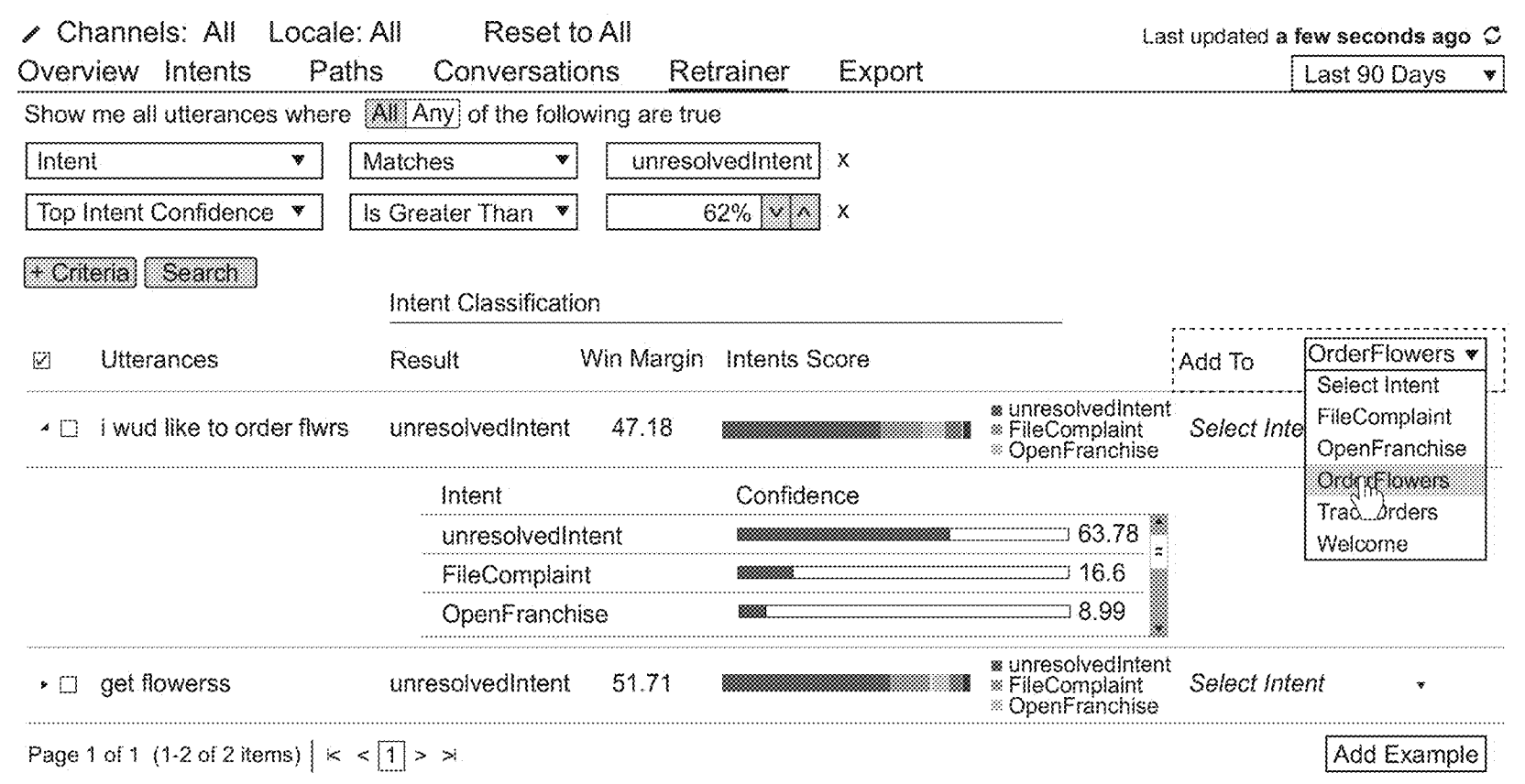

To add these utterances as training data, the user can do the following: Click Retrainer. Filter the report for these utterances by adding the following criteria: Intent matches unresolvedIntent and Top Intent Confidence is greater than 62%; Add these utterances as bulk to the OrderFlowers intent by choosing Utterances, OrderFlowers from the Add menu, and by then clicking Add Example; and Retrain the skill. (see, e.g., FIG. 7I). Using the Closest Predictions chart and the Retrainer, the user can separate the gibberish from the useful content that the user can use to round out the training corpus. The user can also indicate directions that they may want to take to ruggedize their skill. For example, it there's a number of unresolved user utterance that are negative, then the user might consider adding an intent (or even creating a standalone skill) to handle user abuse.

Techniques for Using Insights to Improve Performance of a Bot System

Figure 8:
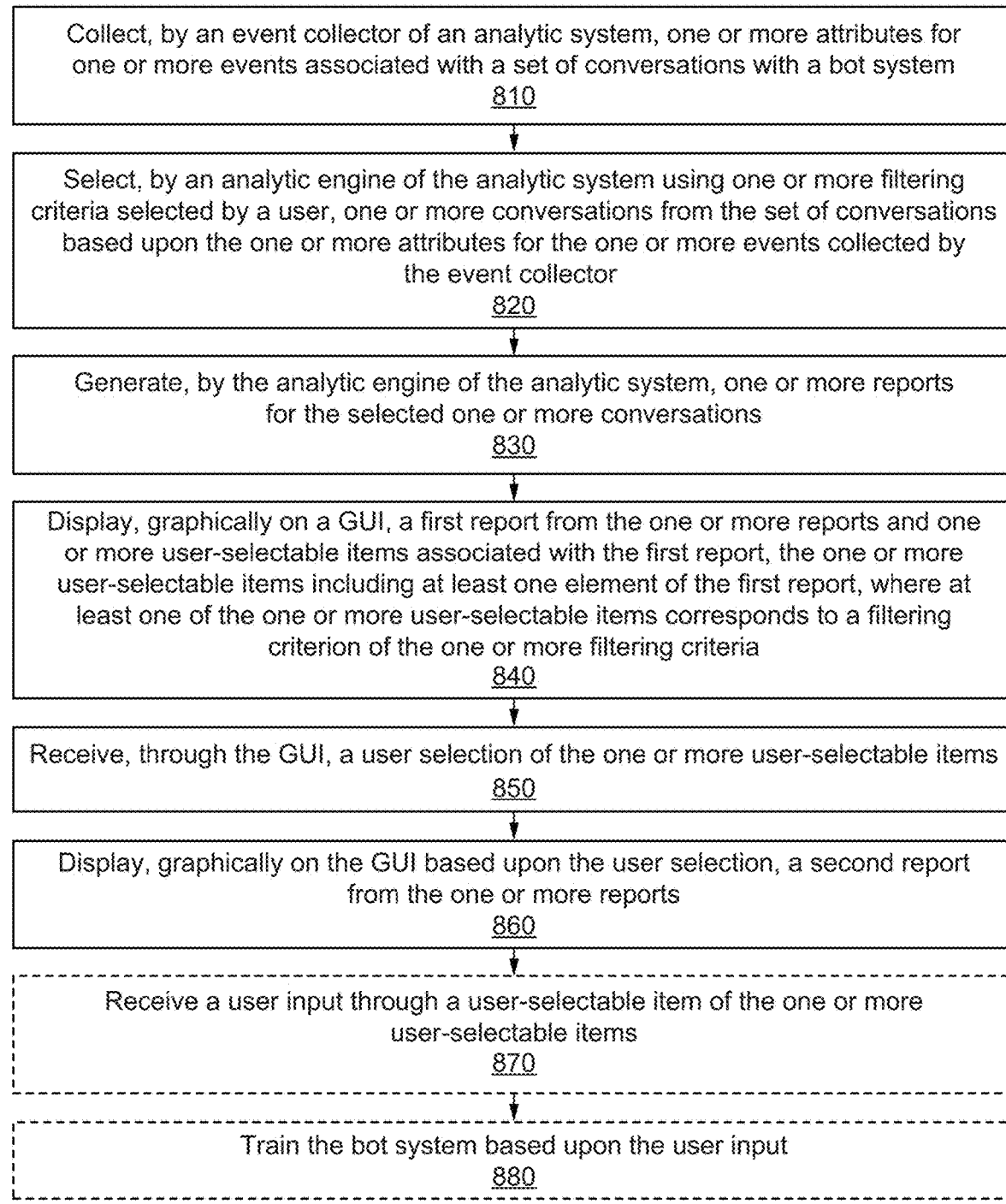
FIG. 8 is a simplified flowchart illustrating processing for using insights to improve performance of a bot system in accordance with various embodiments

FIG. 8 is a simplified flow chart 800 illustrating an example of processing for using insights to improve performance of a bot system according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, a graphical user interface produced according to the processing presented in FIG. 8 may appear as depicted in one of FIGS. 4A-4C, 5A-5E, and 6A-6N.

At step 810, an event collector of an analytic system may collect one or more attributes for one or more events associated with a set of conversations with a bot system. As described above, the event collector may be reconfigurable to selectively collect desire attributes for desired events. The one or more events may include, for example, at least one of a conversation event, a bot state event, an intent resolution event, an entity resolution event, an error event, a timeout event, or a custom event. The one or more attributes may include the attributes described above with respect to, for example, FIG. 2. In some embodiments, the one or more attributes for one or more events associated with a set of conversations may be enriched and saved in a data store.

At step 820, an analytic engine of the analytic system may select, using one or more filtering criteria selected by a user, one or more conversations from the set of conversations based upon the one or more attributes for the one or more events collected by the event collector. The one or more filtering criteria may include, for example, conversations ended at a particular state, conversations started from a particular state, completed or incomplete conversations, conversations associated a particular end user intent, conversations from a particular channel or locale, conversations occurred during a certain time period, and the like.

At step 830, the analytic engine of the analytic system may generate one or more reports for the selected one or more conversations. In some embodiments, the analytic engine may include a REST server. The one or more reports may include, for example, a report including statistics of the set of conversations, a report including statistics of conversations associated with a particular end user intent, a report including conversations associated with the particular end user intent, a report including statistics of incomplete conversations, a report including incomplete conversations, a report including statistics of conversations for which no end user intent is determined, a report including conversations for which no end user intent is determined, a report including options for improving the bot system, or a combination thereof. In some embodiments, the report including conversations for which no end user intent is determined may include, for each conversation of the conversations for which no end user intent is determined, a score indicating a matching between the conversation and each respective end user intent in a set of end user intents.

In some embodiments, the one or more reports may include an aggregated path diagram for the selected one or more conversations. The aggregated path diagram may include a plurality of nodes and a plurality of connections among the plurality of nodes. Each of the plurality of nodes may correspond to a respective state of the bot system. Each of the plurality of connections may represent a transition from one state of the bot system to another state of the bot system. The plurality of nodes may include a start node and an end node. In some embodiments, the aggregated path diagram may include a number associated with each respective connection, where the number may indicate a total number of conversations that include the transition represented by the respective connection. In some embodiments, each node of the plurality of nodes may be a user-selectable item of the one or more user-selectable items. In some embodiments, each connection of the plurality of connections may be a user-selectable item of the one or more user-selectable items.

At step 840, a GUI may graphically display a first report from the one or more reports and one or more user-selectable items associated with the first report. The one or more user-selectable items may include at least one element of the first report. At least one of the one or more user-selectable items may correspond to a filtering criterion of the one or more filtering criteria. In some embodiments, the one or more user-selectable items may include a user-selectable item, which, when selected, causes one or more individual conversations to be display on the GUI. In some embodiments, the one or more user-selectable items may include a menu for selecting conversations ended at a particular state from the set of conversations. In some embodiments, the one or more user-selectable items may include a menu for selecting conversations started from a particular state from the set of conversations. In some embodiments, the one or more user-selectable items may include a menu for selecting completed or incomplete conversations from the set of conversations. In some embodiments, the one or more user-selectable items may include a menu for selecting conversations associated a particular end user intent from the set of conversations.

At step 850, a GUI server may receive, through the GUI, a user selection of the one or more user-selectable items. At 860, a second report from the one or more reports may be displayed graphically on the GUI based upon the user selection. In some embodiments, the second report may include, for example, utterances associated with an individual conversation, and user intents associated with the utterances.

Optionally, at step 870, a user input may be received through a user-selectable item of the one or more user-selectable items. For example, the one or more user-selectable items may include a user-editable item, such as an utterance and/or an intent associated with the utterance. An administrator or developer of the bot system may add, remove, or edit the utterance and/or add, remove, or edit the intent for the utterance. The user input may include a revised utterance or a revised intent for the utterance.

Optionally, at step 880, the bot system may be retrained using the user input to improve the performance of the bot system, such as retraining the intent classification models of the bot system to more accurately determining the user intents.

Illustrative Systems

Figure 9:
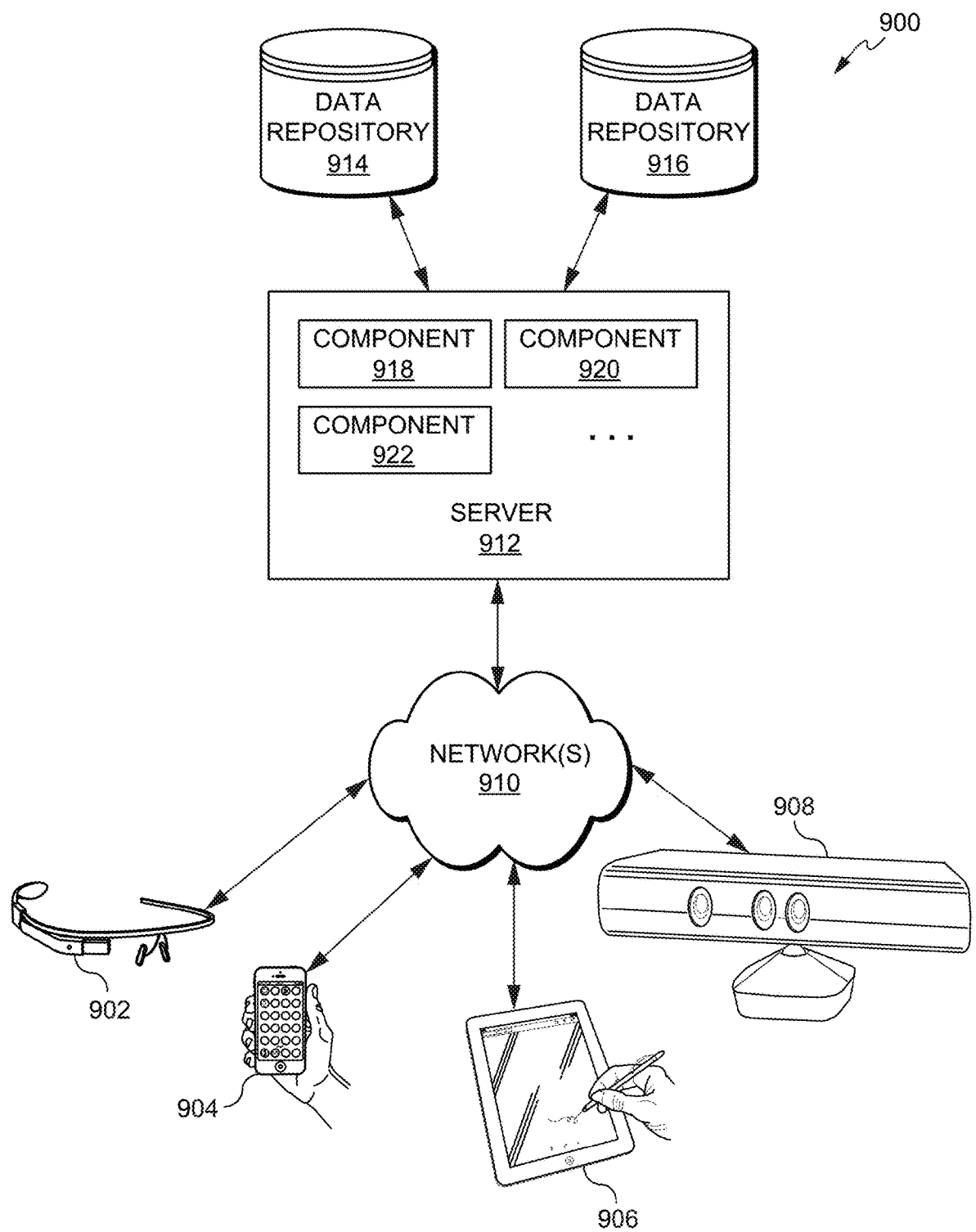
FIG. 9 depicts a simplified diagram of a distributed system for implementing various embodiments.

FIG. 9 depicts a simplified diagram of a distributed system 900. In the illustrated example, distributed system 900 includes one or more client computing devices 902, 904, 906, and 908, coupled to a server 912 via one or more communication networks 910. Clients computing devices 902, 904, 906, and 908 may be configured to execute one or more applications.

In various examples, server 912 may be adapted to run one or more services or software applications that enable one or more embodiments described in this disclosure. In certain examples, server 912 may also provide other services or software applications that may include non-virtual and virtual environments. In some examples, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, server 912 may include one or more components 918, 920 and 922 that implement the functions performed by server 912. These components may include software components that may be executed by one or more processors, hardware components, or combinations thereof. It should be appreciated that various different system configurations are possible, which may be different from distributed system 900. The example shown in FIG. 9 is thus one example of a distributed system for implementing an example system and is not intended to be limiting.

Users may use client computing devices 902, 904, 906, and/or 908 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 9 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 910 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 may include one or more virtual machines running virtual operating systems, or other computing architectures involving virtualization such as one or more flexible pools of logical storage devices that may be virtualized to maintain virtual storage devices for the server. In various examples, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain examples. For example, one or more of the data repositories 914, 916 may be used to store information such as information related to insight information used by server 912 when performing various functions in accordance with various embodiments. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain examples, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 914, 916 may also be used by applications to store application data. The data repositories used by applications may be of different types such as, for example, a key-value store repository, an object store repository, or a general storage repository supported by a file system.

Figure 10:
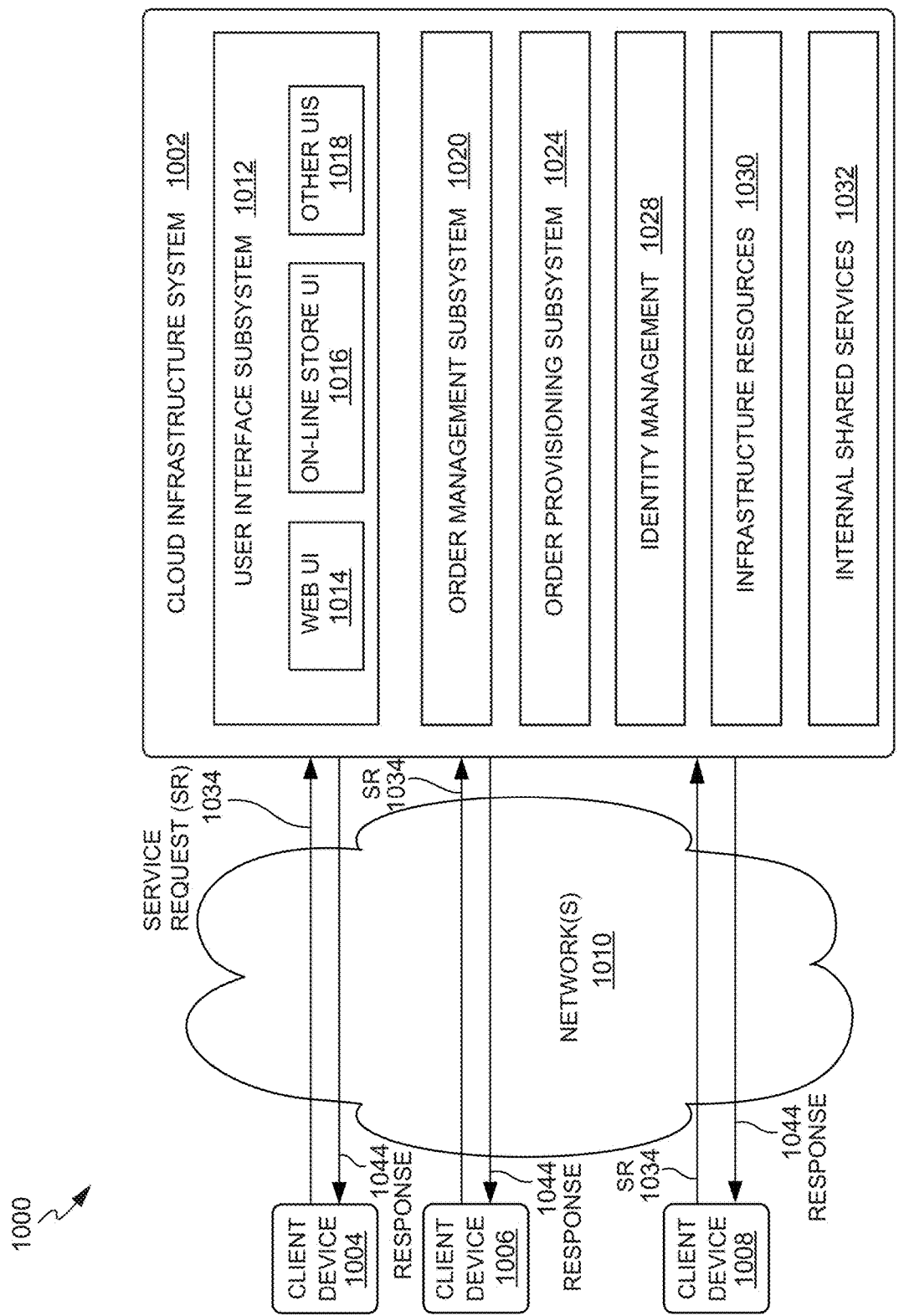
FIG. 10 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 10 is a simplified block diagram of a cloud-based system environment in which various services may be offered as cloud services in accordance with certain examples. In the example depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The example depicted in FIG. 10 is only one example of a cloud infrastructure system and is not intended to be limiting. It should be appreciated that, in some other examples, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative examples.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002. Cloud infrastructure system 1002 then performs processing to provide the services requested in the customer's subscription order. For example, a user may request the cloud infrastructure system to obtain insight data, as described above, and provide services for a chat bot system as described herein. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public customer, where the customer may be an individual or an enterprise. In certain other examples, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as client computing devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request insight data as described in this disclosure.

In some examples, the processing performed by cloud infrastructure system 1002 for providing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for determining insight data for a chat bot system. The data used for this analysis may include structured data (e.g., data stored in a database or structured according to a structured model) and/or unstructured data (e.g., data blobs (binary large objects)).

As depicted in the example in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like. In certain examples, the storage virtual machines that are available for servicing storage requested from applications may be part of cloud infrastructure system 1002. In other examples, the storage virtual machines may be part of different systems.

In certain examples, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a customer may, using a client device, request (service request 1034) one or more services provided by cloud infrastructure system 1002 using one or more of interfaces 1014, 1016, and 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to. For example, a customer may place a subscription order for a service offered by cloud infrastructure system 1002. As part of the order, the customer may provide information identifying a chat bot system for which the service is to be provided and optionally one or more credentials for the chat bot system.

In certain examples, such as the example depicted in FIG. 10, cloud infrastructure system 1002 may comprise an order management subsystem (OMS) 1020 that is configured to process the new order. As part of this processing, OMS 1020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1002 as part of the provisioning process. Cloud infrastructure system 1002 may generate an application ID and select a storage virtual machine for an application from among storage virtual machines provided by cloud infrastructure system 1002 itself or from storage virtual machines provided by other systems other than cloud infrastructure system 1002.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chat bot system ID generated by cloud infrastructure system 1002 and information identifying a chat bot system selected by cloud infrastructure system 1002 for the chat bot system corresponding to the chat bot system ID.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain examples, cloud infrastructure system 1002 comprises an identity management subsystem (IMS) 1028 that is configured to manage customer information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
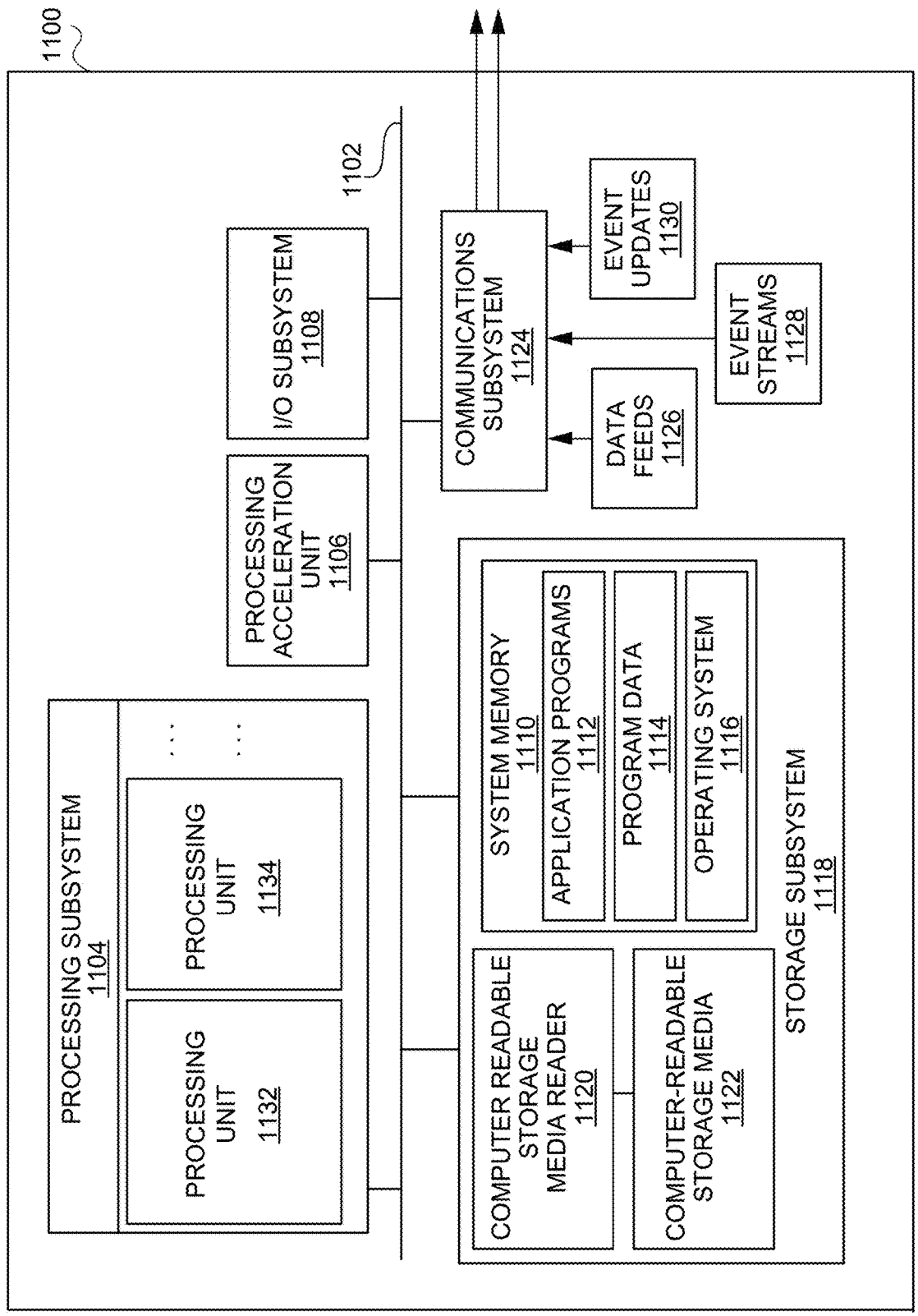
FIG. 11 illustrates an example computer system that may be used to implement various embodiments.

FIG. 11 illustrates an example of computer system 1100. In some examples, computer system 1100 may be used to implement any of the digital assistant or chat bot systems within a distributed environment, and various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative examples of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may include be single core or multicore processors. The processing resources of computer system 1100 may be organized into one or more processing units 1132, 1134, etc. A processing unit may include one or more processors, one or more cores from the same or different processors, a combination of cores and processors, or other combinations of cores and processors. In some examples, processing subsystem 1104 may include one or more special purpose co-processors such as graphics processors, digital signal processors (DSPs), or the like. In some examples, some or all of the processing units of processing subsystem 1104 may be implemented using customized circuits, such as application specific integrated circuits (ASICs), or field programmable gate arrays (FPGAs).

In some examples, the processing units in processing subsystem 1104 may execute instructions stored in system memory 1110 or on computer readable storage media 1122. In various examples, the processing units may execute a variety of programs or code instructions and may maintain multiple concurrently executing programs or processes. At any given time, some or all of the program code to be executed may be resident in system memory 1110 and/or on computer-readable storage media 1122 including potentially on one or more storage devices. Through suitable programming, processing subsystem 1104 may provide various functionalities described above. In instances where computer system 1100 is executing one or more virtual machines, one or more processing units may be allocated to each virtual machine.

In certain examples, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some examples. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide authentication in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1122 may store programming and data constructs that provide the functionality of some examples. Computer-readable media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1118 may also include a computer-readable storage media reader 1120 that may further be connected to computer-readable storage media 1122. Reader 1120 may receive and be configured to read data from a memory device such as a disk, a flash drive, etc.

In certain examples, computer system 1100 may support virtualization technologies, including but not limited to virtualization of processing and memory resources. For example, computer system 1100 may provide support for executing one or more virtual machines. In certain examples, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, when computer system 1100 is used to implement bot system 120 depicted in FIG. 1, the communication subsystem may be used to communicate with an application system and also a system executing a storage virtual machine selected for an application.

Communication subsystem 1124 may support both wired and/or wireless communication protocols. In certain examples, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1124 may provide wired network connectivity (e.g., Ethernet) in addition to or instead of a wireless interface.

Communication subsystem 1124 may receive and transmit data in various forms. In some examples, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, it should be appreciated there may be other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
   accessing a plurality of events generated by a bot system, the bot system comprising a plurality of bots, each bot of the plurality of bots implemented using one or more trained machine-learning models;
   generating a plurality of reports based on the plurality of events;
   receiving an indication of a selection of a report of the plurality of reports, the indication of the selection received in response to a user providing an input on a graphical user interface, wherein the report provides a conversation completion performance indicator for providing insight into a percentage of complete conversations performed by the plurality of bots, a conversation completion performance indicator for providing insight into a number of complete conversations performed by each respective bot of the plurality of bots, and a conversation incompletion performance indicator for providing insight into a number of incomplete conversations performed by each respective bot of the plurality of bots; and
   in response to receiving the indication of the selection of the report, displaying the report and a plurality of user-selectable items for interacting with the report, wherein a user-selectable item of the plurality of user-selectable items comprises an element for selecting a portion of a conversation between a user of the bot system and a bot of the plurality of bots.

2. The method of claim 1, wherein at least one event of the plurality of events is generated in response to the bot system determining one or more intents for a conversation between a user and one or more bots of the bot system.

3. The method of claim 1, wherein a report of the plurality of reports provides insight into conversations performed of the plurality of bots over a period of time.

4. The method of claim 1, wherein the report includes a graphic for evaluating performance of one or more bots of the plurality of bots.

5. The method of claim 1, wherein the report includes information for evaluating types of errors in performance of one or more bots of the plurality of bots.

6. The method of claim 1, wherein the conversation is included in a dialog between one or more bots of the bot system and the user.

7. The method of claim 1, wherein the element for selecting the portion of the conversation comprises a plurality of sub-elements for filtering one or more conversational elements from the conversation.

8. A system comprising:
   a processing system; and
   one or more computer readable storage media storing instructions which, when executed by the processing system, cause the system to perform a method comprising:
      accessing a plurality of events generated by a bot system, the bot system comprising a plurality of bots, each bot of the plurality of bots implemented using one or more trained machine-learning models;
      generating a plurality of reports based on the plurality of events;
      receiving an indication of a selection of a report of the plurality of reports, the indication of the selection received in response to a user providing an input on a graphical user interface, wherein the report provides a conversation completion performance indicator for providing insight into a percentage of complete conversations performed by the plurality of bots, a conversation completion performance indicator for providing insight into a number of complete conversations performed by each respective bot of the plurality of bots, and a conversation incompletion performance indicator for providing insight into a number of incomplete conversations performed by each respective bot of the plurality of bots; and
      in response to receiving the indication of the selection of the report, displaying the report and a plurality of user-selectable items for interacting with the report, wherein a user-selectable item of the plurality of user-selectable items comprises an element for selecting a portion of a conversation between a user of the bot system and a bot of the plurality of bots.

9. The system of claim 8, wherein at least one event of the plurality of events is generated in response to the bot system determining one or more intents for a conversation between a user and one or more bots of the bot system.

10. The system of claim 8, wherein a report of the plurality of reports provides insight into conversations performed of the plurality of bots over a period of time.

11. The system of claim 8, wherein the report includes a graphic for evaluating performance of one or more bots of the plurality of bots.

12. The system of claim 8, wherein the report includes information for evaluating types of errors in performance of one or more bots of the plurality of bots.

13. The system of claim 8, wherein the conversation is included in a dialog between one or more bots of the bot system and the user.

14. The system of claim 8, wherein the element for selecting the portion of the conversation comprises a plurality of sub-elements for filtering one or more conversational elements from the conversation.

15. One or more non-transitory computer-readable media storing computer-readable instructions that, when executed by a processing system, cause a system to perform a method comprising:

accessing a plurality of events generated by a bot system, the bot system comprising a plurality of bots, each bot of the plurality of bots implemented using one or more trained machine-learning models;

generating a plurality of reports based on the plurality of events;

receiving an indication of a selection of a report of the plurality of reports, the indication of the selection received in response to a user providing an input on a graphical user interface, wherein the report provides a conversation completion performance indicator for providing insight into a percentage of complete conversations performed by the plurality of bots, a conversation completion performance indicator for providing insight into a number of complete conversations performed by each respective bot of the plurality of bots, and a conversation incompletion performance indicator for providing insight into a number of incomplete conversations performed by each respective bot of the plurality of bots; and in response to receiving the indication of the selection of the report, displaying the report and a plurality of user-selectable items for interacting with the report, wherein a user-selectable item of the plurality of user-selectable items comprises an element for selecting a portion of a conversation between a user of the bot system and a bot of the plurality of bots.

16. The one or more non-transitory computer-readable media of claim 15, wherein at least one event of the plurality of events is generated in response to the bot system determining one or more intents for a conversation between a user and one or more bots of the bot system.

17. The one or more non-transitory computer-readable media of claim 15, wherein the report includes a graphic for evaluating performance of one or more bots of the plurality of bots.

18. The one or more non-transitory computer-readable media of claim 15, wherein the report includes information for evaluating types of errors in performance of one or more bots of the plurality of bots.

19. The one or more non-transitory computer-readable media of claim 15, wherein the conversation is included in a dialog between one or more bots of the bot system and the user.

20. The one or more non-transitory computer-readable media of claim 15, wherein the element for selecting the portion of the conversation comprises a plurality of sub-elements for filtering one or more conversational elements from the conversation.

* * * * *

UNITED STATES PATENT AND TRADEMARK OFFICE
CERTIFICATE OF CORRECTION

| | |
|---|---|
| PATENT NO. | : 12,242,539 B2 |
| APPLICATION NO. | : 18/137829 |
| DATED | : March 4, 2025 |
| INVENTOR(S) | : Subramaniam et al. |

It is certified that error appears in the above-identified patent and that said Letters Patent is hereby corrected as shown below:

On the Title Page

Column 1, under (73) Assignee, Line 2, delete "Redwood Shores (CA)" and insert -- Redwood Shores, CA (US) --, therefor.

In page 2, Column 1, item (56) under Other Publications, Line 3, delete "16/829, 976," and insert -- 16/829,976, --, therefor.

In the Drawings

On sheet 37 of 38, under Reference Numeral 1018, FIG. 10, Line 1, delete "UIS" and insert -- UIs --, therefor.

In the Specification

In Column 7, Line 37, delete "embodiments" and insert -- embodiments. --, therefor.

In Column 16, Line 56, delete "account,"" and insert -- account?," --, therefor.

In Column 27, Line 4, delete "report," and insert -- report?, --, therefor.

In Column 27, Line 11, delete "report," and insert -- report?, --, therefor.

In Column 33, Line 38, delete "+Critera" and insert -- +Criteria --, therefor.

In Column 34, Line 15, delete "moneey"" and insert -- money" --, therefor.

In Column 35, Lines 43-44, delete "Its System. Switch" and insert -- Its System.Switch --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,242,539 B2

In Column 40, Line 12, delete "Mobile" and insert -- Mobile®, --, therefor.

In Column 40, Line 15, delete "iPhone)," and insert -- iPhone®), --, therefor.